(12) United States Patent
Waatti et al.

(10) Patent No.: US 8,005,558 B2
(45) Date of Patent: Aug. 23, 2011

(54) THREE-DIMENSIONAL DESIGN LASTS FOR FOOTWEAR

(75) Inventors: Todd A. Waatti, Battleground, WA (US); David T. Brack, Vancouver, WA (US)

(73) Assignee: Nike, Inc., Beaverton, OR (US)

( * ) Notice: Subject to any disclaimer, the term of this patent is extended or adjusted under 35 U.S.C. 154(b) by 950 days.

(21) Appl. No.: 11/901,244

(22) Filed: Sep. 14, 2007

(65) Prior Publication Data

US 2009/0073162 A1 Mar. 19, 2009

(51) Int. Cl.
*G06F 19/00* (2011.01)
*G06T 19/20* (2011.01)
(52) U.S. Cl. .......................................... 700/98; 345/420
(58) Field of Classification Search ........................ None
See application file for complete search history.

(56) References Cited

U.S. PATENT DOCUMENTS

| 6,968,075 B1 * | 11/2005 | Chang | 382/111 |
| 2004/0168329 A1 * | 9/2004 | Ishimaru | 33/3 R |
| 2008/0104778 A1 | 5/2008 | Drake et al. | |

FOREIGN PATENT DOCUMENTS

EP 1354529 A1 10/2003

OTHER PUBLICATIONS

Butdee, S. "Hybrid Feature Modeling for Sport Shoe Sole Design." in: Computers & Industrial Engineering, vol. 42, No. 2-4 (Apr. 11, 2002), pp. 271-279.*

Chen, J. et al. "Development of an Integrated CAD/CAM System for Shoe Last." in: Proceedings of the IEEE International Conference on Mechatronics & Automation (Jul. 2005), pp. 1107-1111.*
Kolmanič, S. et al. "A New Approach in CAD System for Designing Shoes." Journal of Computing and Information Technology, vol. 11, No. 4 (2003), pp. 319-326.*
Leng, J. et al. "A CAD Approach for Designing Customized Shoe Last." Computer-Aided Design & Applications, vol. 3, Nos. 1-4 (2006), pp. 377-384.*
International Search Report in corresponding PCT Application, International Application No. PCT/US2008/073709, mailed Nov. 24, 2008.
International Preliminary Report on Patentability in corresponding PCT Application, International Application No. PCT/US2008/073709 mailed Mar. 25, 2010.

* cited by examiner

*Primary Examiner* — Jason M Repko
(74) *Attorney, Agent, or Firm* — Banner & Witcoff, Ltd.

(57) ABSTRACT

Systems and methods for generating three-dimensional design lasts for footwear include: (a) generating a three-dimensional last structure on the computer display (e.g., having the appearance of a conventional footwear last structure); (b) receiving user input indicating offset values for various zones of the last structure, wherein the user input indicates offset values for one or more of: a toe region, a heel region, an ankle region, a forefoot region, and/or an instep region; and (c) generating a three-dimensional design last for the footwear on the computer based on the three-dimensional last structure and the user input indicating the desired offset values. The three-dimensional design last may constitute a modified version of the three-dimensional last structure that has an increased thickness to simulate a desired thickness of an upper material placed on the last structure and/or to more closely simulate an appearance of an actual footwear upper.

25 Claims, 26 Drawing Sheets

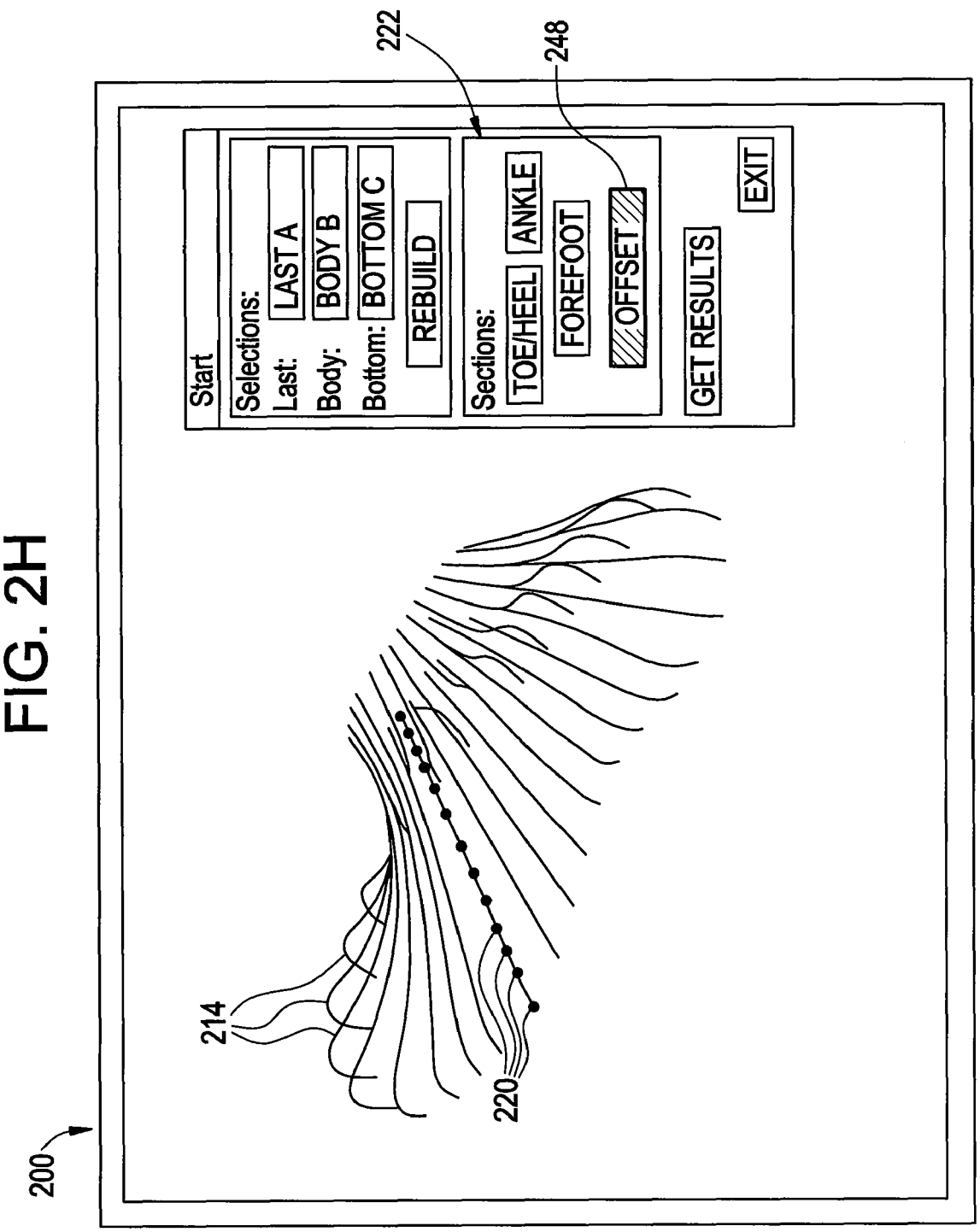

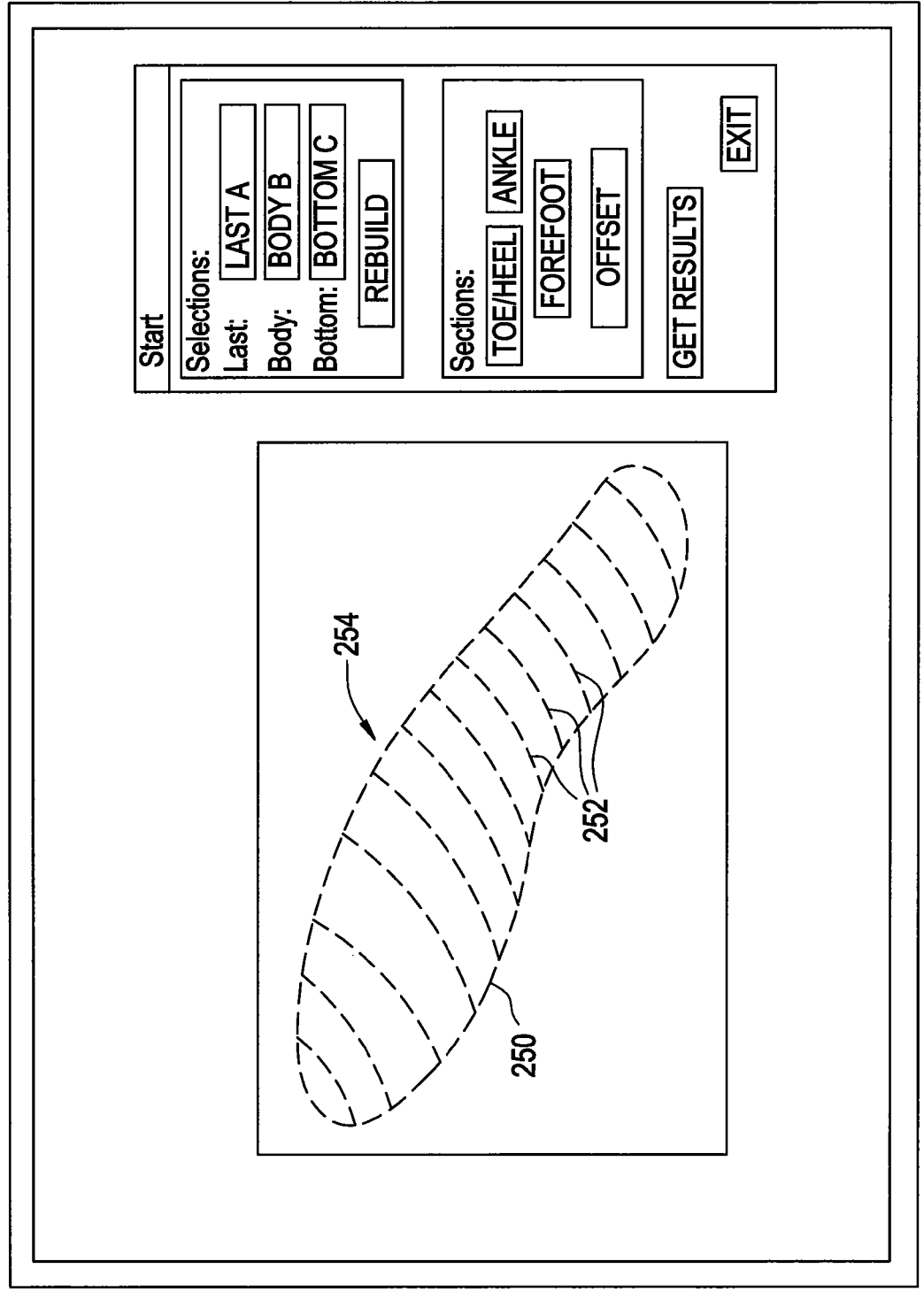

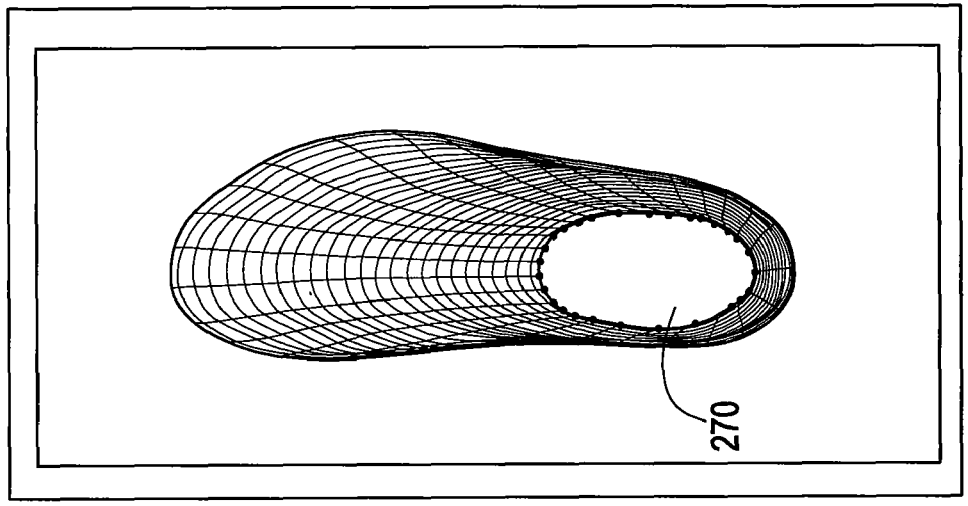
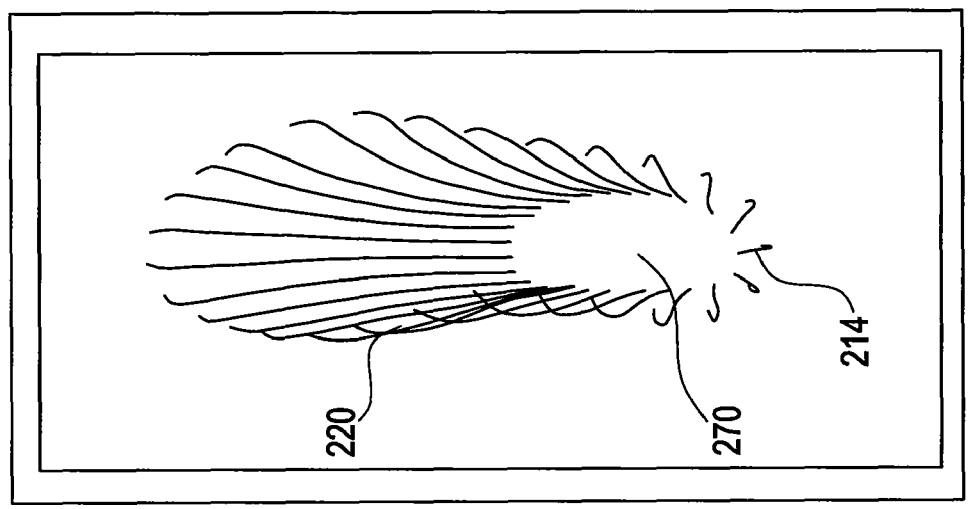
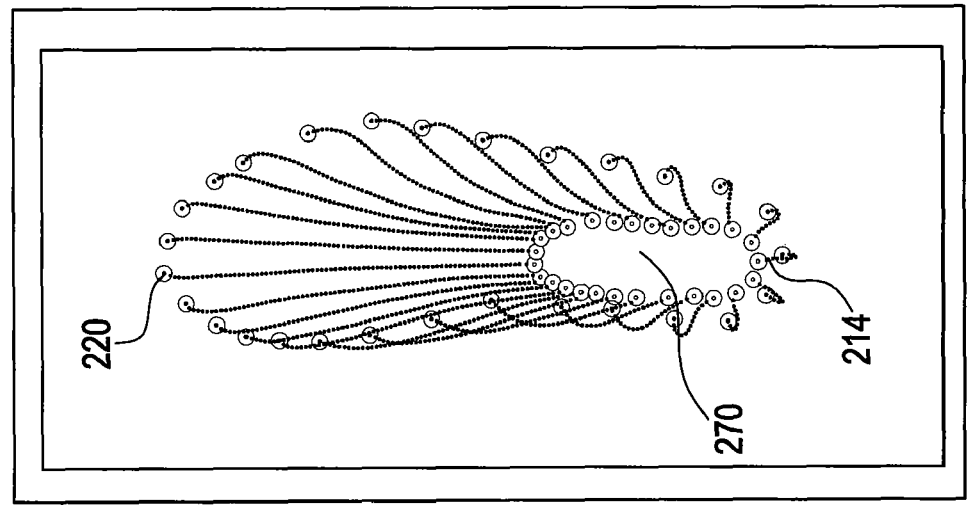

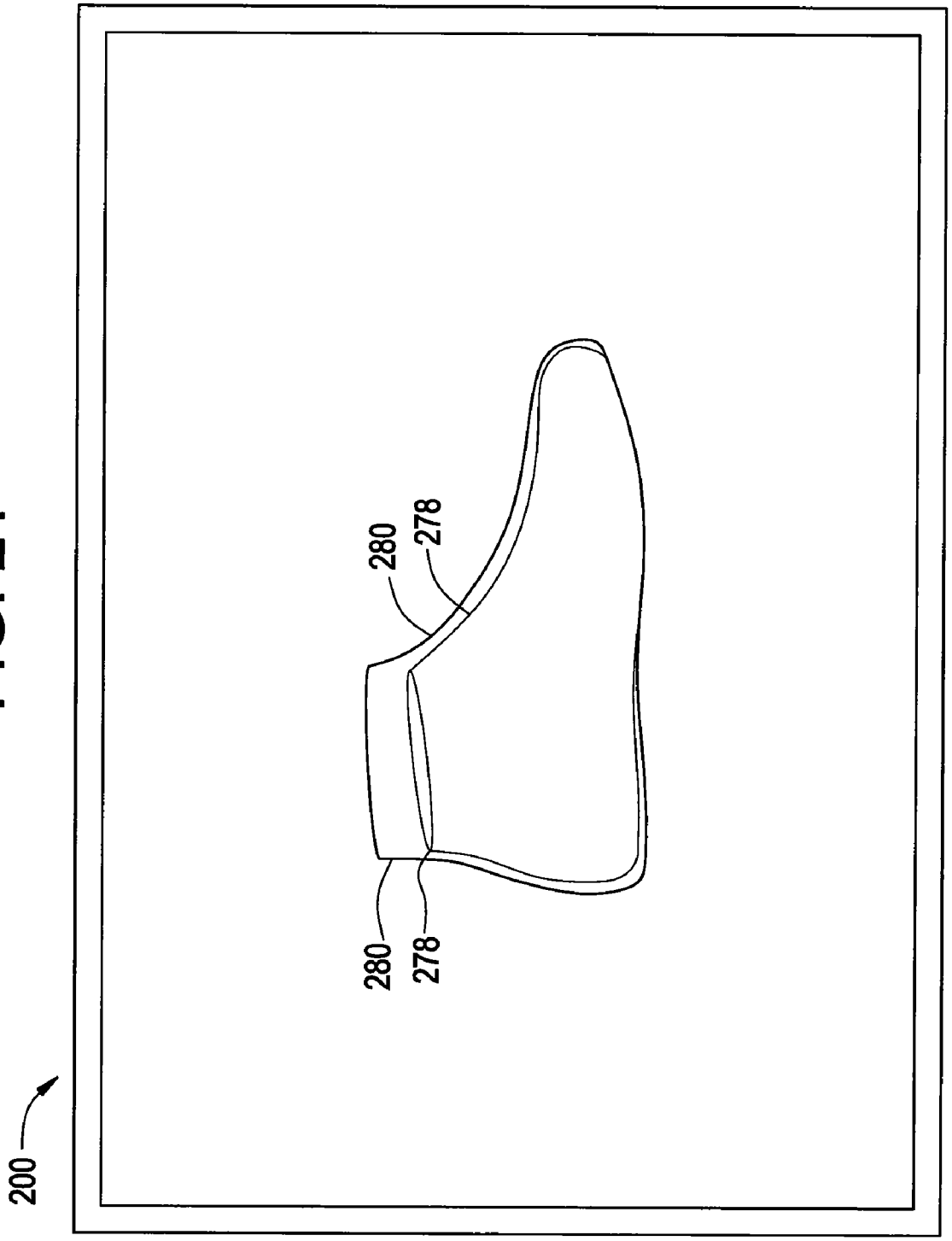

THREE-DIMENSIONAL DESIGN LASTS FOR FOOTWEAR

FIELD OF THE INVENTION

This invention relates generally to computer-generated three-dimensional design lasts for designing footwear.

BACKGROUND

Many footwear products are manufactured with the use of a "last," a physical element that helps provides shape for the upper member during the manufacturing process. While providing an adequate base for physical manufacture, because it must fit within a footwear upper and must be capable of being removed from an assembled upper, a last is shaped somewhat different from the upper. For example, the last must be somewhat smaller than the upper to enable it to fit inside and to be removable from the upper. Additionally, last structures typically have a significantly smaller ankle opening area and a significantly overall narrower ankle structure than the final upper structure produced thereon. Additionally, last structures typically have a steeper tongue or instep area than the final upper structure produced thereon.

Because of these differences, attempting to design an upper member structure, even using computer-aided design packages (CAD programs), can be difficult or problematic if one attempts to start the design based on the last structure. The design may look somewhat different from the final product if built on the last structure because of the last's differences in size and shape. Not starting with a desired last structure for the design, however, risks developing an upper design that cannot be produced using the desired last structure. Accordingly, improvements in computer-aided design for footwear structures would be a welcome advance in the art.

SUMMARY

Aspects of this invention relate to computer-implementable methods for generating three-dimensional design lasts for designing footwear on a computer. Such methods may include: (a) generating a three-dimensional last structure on a computer display (e.g., having the appearance of a conventional footwear last structure); (b) receiving user input indicating plural "offset" values for plural zones of the three-dimensional last structure, wherein the user input indicates plural desired offset values (or increased thickness dimensions) in at least one region of an article of footwear selected from the group of: a toe region of the article of footwear, a heel region of the article of footwear, an ankle region of the article of footwear, a forefoot region of the article of footwear, a tongue region of the article of footwear, and an instep region of the article of footwear, wherein the user input indicating the offset values need not indicate a constant offset value over the plural zones or over the entire three-dimensional last structure; and (c) generating a three-dimensional design last for the footwear on the computer display based on the three-dimensional last structure and the user input indicating the plural desired offset values. The three-dimensional design last may constitute a version of the three-dimensional last structure that has been modified to have an increased thickness to simulate a desired thickness of an upper material placed on the last structure and/or to more closely simulate an appearance of an actual footwear upper.

Additional aspects of this invention relate to computer-readable media including computer-executable instructions stored thereon for performing the methods described above (e.g., computer systems, disks, etc.) and/or for providing graphical user interfaces of the types described in more detail below (e.g., for performing at least some portions of the methods and/or for operating at least some portions of the systems described in more detail below).

Still additional aspects of this invention relate to systems for generating three-dimensional design lasts of the types and/or for performing the methods described above. Such systems may include: (a) a display device (such as a computer monitor or other display device driven by a computer, etc.); (b) an input system for receiving user inputs of the various types described above (e.g., offset values for plural zones of a three-dimensional last structure, etc.); and (c) a processing system (such as one or more computer processors or microprocessors, etc.) programmed and adapted to: (i) generate an initial three-dimensional last structure on the computer display and (ii) generate a three-dimensional design last for the footwear on the computer display based on the initial three-dimensional last structure and the various user inputs (e.g., indicating the plural desired offset values), wherein the three-dimensional design last constitutes a version of the three-dimensional last structure that has been modified to have an increased thickness to simulate a desired thickness of an upper material placed on the last structure and/or to more closely simulate an appearance of an actual footwear upper. The three-dimensional design last may include other modifications from the initial three-dimensional last structure.

BRIEF DESCRIPTION OF THE DRAWINGS

A more complete understanding of the present invention and at least some features and advantages thereof may be acquired by referring to the following description and the accompanying drawings, in which like reference numbers indicate like features throughout, and wherein.

DETAILED DESCRIPTION

Figure 1:
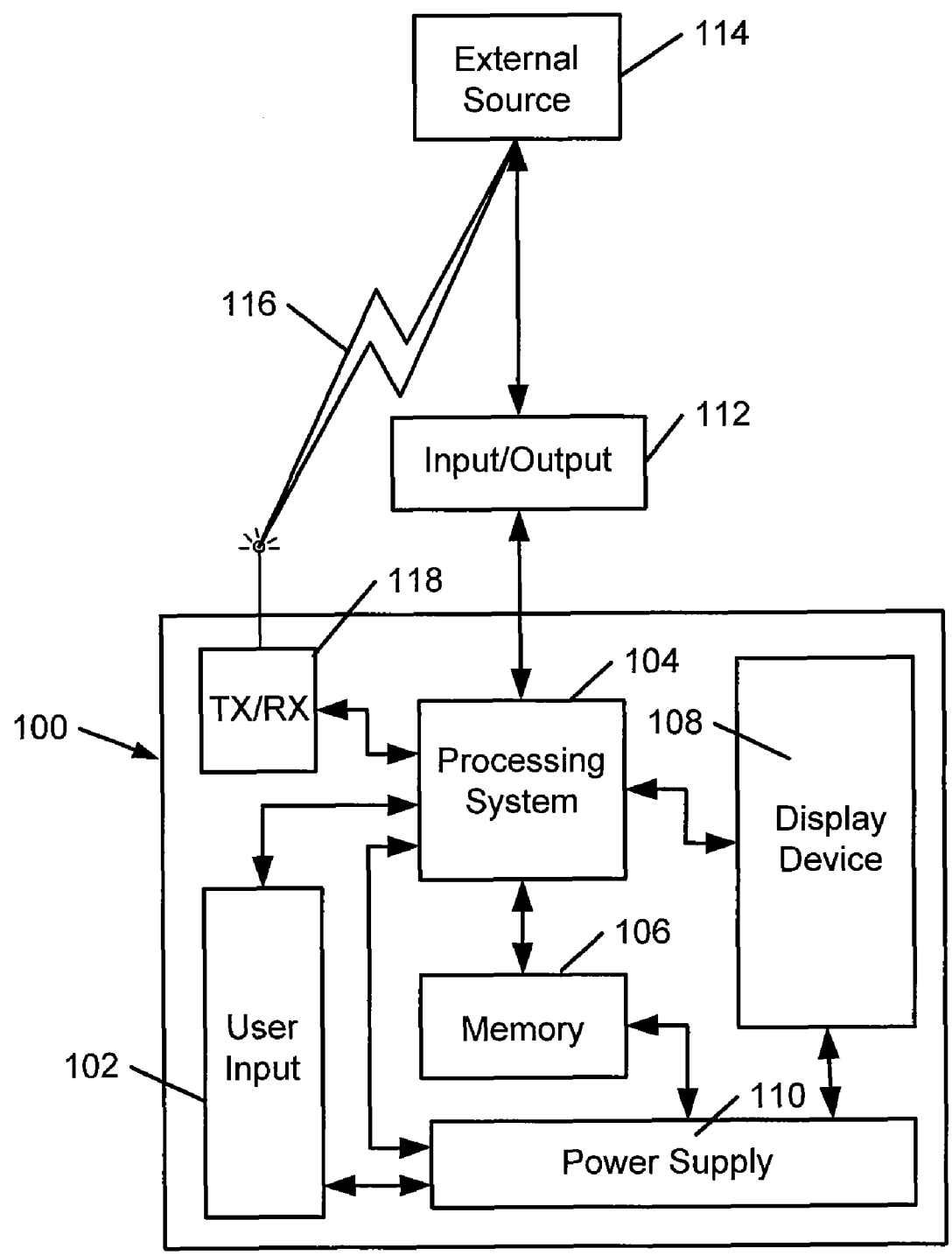
FIG. 1 illustrates a schematic diagram of an example system for use in generating and using three-dimensional design lasts in accordance with at least some examples this invention.

In the following description of various examples of the present invention, reference is made to the accompanying drawings, which form a part hereof, and in which are shown by way of illustration various structures, embodiments, user interfaces, and examples in which aspects of the invention may be used and practiced. It is to be understood that other embodiments may be utilized, structural and functional modifications may be made to the various illustrated and described elements or steps, and/or variations in the user interface elements, structure, and/or function may be made without departing from the scope of the present invention. Aspects of this invention relate to any of the components, features, elements, or steps described as part of the systems, methods, and user interfaces below, as well as to any desired combinations or subcombinations of such components, features, elements, or steps.

I. GENERAL DESCRIPTION OF SYSTEMS, METHODS, USER INTERFACES, AND COMPUTER-READABLE MEDIA USEFUL FOR PRACTICING ASPECTS OF THE INVENTION

Aspects of the present invention relate generally to computer-implementable methods for generating three-dimensional design lasts for footwear on a computer display. Such methods may include: (a) generating a three-dimensional last structure on the computer display (e.g., from a commercial source, having the appearance of a conventional footwear last structure, etc.); (b) receiving user input indicating plural offset values for plural zones of the three-dimensional last structure, wherein the user input indicates plural desired offset values in at least one region of an article of footwear selected from the group of: a toe region of the article of footwear, a heel region of the article of footwear, an ankle region of the article of footwear, a forefoot region of the article of footwear, a tongue region of the article of footwear, and an instep region of the article of footwear, wherein the user input indicating the offset values need not indicate a constant offset value over the plural zones and/or over the entire three-dimensional last structure; and (c) generating a three-dimensional design last for the footwear on the computer display based at least in part on the three-dimensional last structure and the user input indicating the plural desired offset values. The three-dimensional design last may constitute a version of the three-dimensional last structure that has been modified to have an increased thickness to simulate a desired thickness of an upper material placed on the last structure and/or to more closely simulate an appearance of an actual footwear upper.

In addition to receiving user input indicating offset values for various regions of the last structure, methods in accordance with examples of this invention may receive user input indicating or modifying the shapes of various other areas of the three-dimensional design last (e.g., to make the design last even more closely resemble an actual upper structure). For example, methods in accordance with examples of this invention may receive user input indicating a desired shape of the ankle region for the three-dimensional design last, including a desired foot-receiving opening shape and/or a desired substantially vertical section shape of at least some portion of the ankle region. As other examples, if desired, methods in accordance with at least some examples of this invention may receive user input indicating a desired shape of the instep or tongue region for the three-dimensional design last (e.g., a desired thickness, flatness, or steepness of the instep or tongue area, etc.).

As one step in generating a three-dimensional design last, methods in accordance with at least some examples of this invention may start with a computer-generated three-dimensional last structure (e.g., from a commercial or known source) and generate plural lines or curves representing a surface location of the last structure, wherein at least some of the plural lines or curves extend from the ankle region of the last structure to a sole region of the last structure and indicate a contour of the surface of the last structure. While any number of lines or curves may be used to represent the overall last structure, in some examples of this invention, the surface of the last structure will be represented by 20 to 50 curves generally running from the foot-receiving opening area of the last structure to its sole region. In some examples of this invention, 25-35 curves or even 30-35 curves will be used around the circumference of the computer-generated last structure. Furthermore, the three-dimensional last structure may be modified so that at least some of the plural curves representing the surface location will include plural control points (e.g., points on the curves whose positions can be modified and controlled by the user and/or the computer system to generate the modified three-dimensional last structure). While any number of control points may be provided on a given curve, in some examples of this invention, a given curve will have from 5-25 control points, and in some more specific examples, a curve will have from 5-20 control points, from 6-18 control points, or even from 8-15 control points. The user input indicating the plural offset values for the plural zones of the three-dimensional last structure, as well as any other user inputs, may be used to modify locations of at least some of the control points and to thereby modify a shape of the surface defined by the plural curves and to determine and generate the three-dimensional design last surface structure.

Methods in accordance with examples of this invention further may generate the three-dimensional design last as a computer-generated display element representing a surface location of the three-dimensional design last, wherein the surface location is determined based on the modified locations of the control points (e.g., modified from the initial three-dimensional last structure based on user inputs, offset values, etc.). In generating the three-dimensional design last, the surface location of the design last may be formed as a smoothed curve fit representing the surface location among adjacent control points of the plural curves.

Three-dimensional design lasts in accordance with examples of this invention may be used for additional purposes. For example, once the design last is produced (which can represent the size and shape of an upper material for a final shoe design), other features of a footwear design may be added to the computer-generated design last, such as: features of a desired bottom surface for the three-dimensional design last (e.g., a single or double lasted bottom surface, an additional bottom surface element, etc.); features of a sole structure to be engaged with the three-dimensional design last (e.g., midsole features, outsole features, tread features, etc.); aesthetic design elements relating to the upper member or sole member (e.g., stitching patterns, logos, trademarks, colors, etc.); functional features (e.g., eyelets, laces, elastic bands, securing systems, etc.); etc. Moreover, three-dimensional design last features produced by methods of this invention may be used in rapid prototyping systems or selective laser sintering systems, e.g., for producing prototype footwear models or structures.

Additional aspects of this invention relate to computer-readable media including computer-executable instructions stored thereon for performing one or more of the methods described above. Still additional aspects of this invention relate to computer-readable media including computer-executable instructions stored thereon for generating user interface screens and systems for preparing and using three-dimensional design lasts and/or for operating three-dimensional design last systems of the types described herein. Such computer-readable media include, but are not necessarily limited to: computer-readable memories, both internal to a computer (e.g., hard drives) or separable from the computer (such as disks, solid state or flash memory devices, etc.).

Still additional aspects of this invention relate to systems for generating three-dimensional design lasts, e.g., of the types described above. Such systems may include: (a) a display device (such as a computer monitor or other display device connected with and/or driven by a computer, etc.); (b) an input system for receiving user inputs of the various types described above (e.g., offset values for plural zones of a three-dimensional last structure, shape feature inputs, bottom surface structure inputs, additional design element inputs, etc.); and (c) a processing system (such as one or more computer processors or microprocessors, etc.) programmed and adapted to: (i) generate a three-dimensional last structure on the computer display and (ii) generate a three-dimensional design last for the footwear on the computer display based on the three-dimensional last structure and the various user inputs (e.g., inputs indicating the plural desired offset values), wherein the three-dimensional design last constitutes a version of the three-dimensional last structure that has been modified to have an increased thickness to simulate a desired thickness of an upper material placed on the last structure and/or to more closely simulate an appearance of an actual footwear upper. The input systems may include conventional input devices, such as: a keyboard (hard keyboard or soft keyboard); a mouse, trackball, rollerball, touchpad, or other pointing device; a disk drive; a USB port; a network connection; etc.

Given the above general description of systems, methods, user interfaces, and computer-readable media in accordance with examples of this invention, more detailed and specific examples of such systems, methods, and user interfaces follow.

II. SPECIFIC EXAMPLES OF THREE-DIMENSIONAL DESIGN LAST GENERATING SYSTEMS, METHODS, AND USER INTERFACES ACCORDING TO THE INVENTION

As described above, aspects of this invention relate to computer-implementable systems and methods for designing footwear, e.g., in the form of computer-generated three-dimensional design lasts. FIG. 1 illustrates a schematic diagram of an example three-dimensional design last system 100 in accordance with some examples of this invention. This example system 100, which may be in the form of a conventional personal computer ("PC"), laptop, computer workstation (e.g., connected to a network), or the like, may include various elements such as a user input system 102, for receiving user input, e.g., to enter or adjust settings (as will be described in more detail below), to control the functions or settings of the system 100 or various components thereof, etc. Any desired type of user input system 102 may be provided without departing from the invention, including, for example, a keyboard input, a mouse input, other "pointer" type inputs (such as a roller ball, track ball, or the like), a stylus type input, a touch pad input, a voice input, a button type input (hard or soft buttons), a soft keyboard input, a scanner input, etc. The system 100 further may include its own processing system 104 (e.g., one or more microprocessors), a computer-readable memory system 106, a display device 108 (e.g., a computer monitor), and/or a power supply 110 (e.g., AC and/or DC power supply).

Systems and methods in accordance with examples of this invention may receive data, input, and/or other information in other ways as well. For example, an input/output system 112 may be provided for receiving data, input, and/or other information from remote or other external sources 114. The input/output system 112 may be any desired type of input/output interface device for receiving data, such as a disk drive (e.g., read/write systems for floppy disks, CDs, DVDs, etc.); a USB port; an Ethernet, telephone, or other wired connection port or system; etc. Similarly, the external source 114 may be a disk, flash drive, memory stick, or other computer-readable medium for storing and transmitting data; an internet or other remotely located network or data source; etc. As another option or alternative, an external source 114 may be connected to the design system 100 via a wireless connection (represented at reference number 116), which may be operatively coupled to an appropriate wireless transmission/reception interface 118 provided with or operatively coupled to the system 100. The various components of the overall system illustrated in FIG. 1 may be included within a single housing or component or may be provided as any desired number of separate components and/or at any desired number of locations without departing from this invention.

Figure 2A:
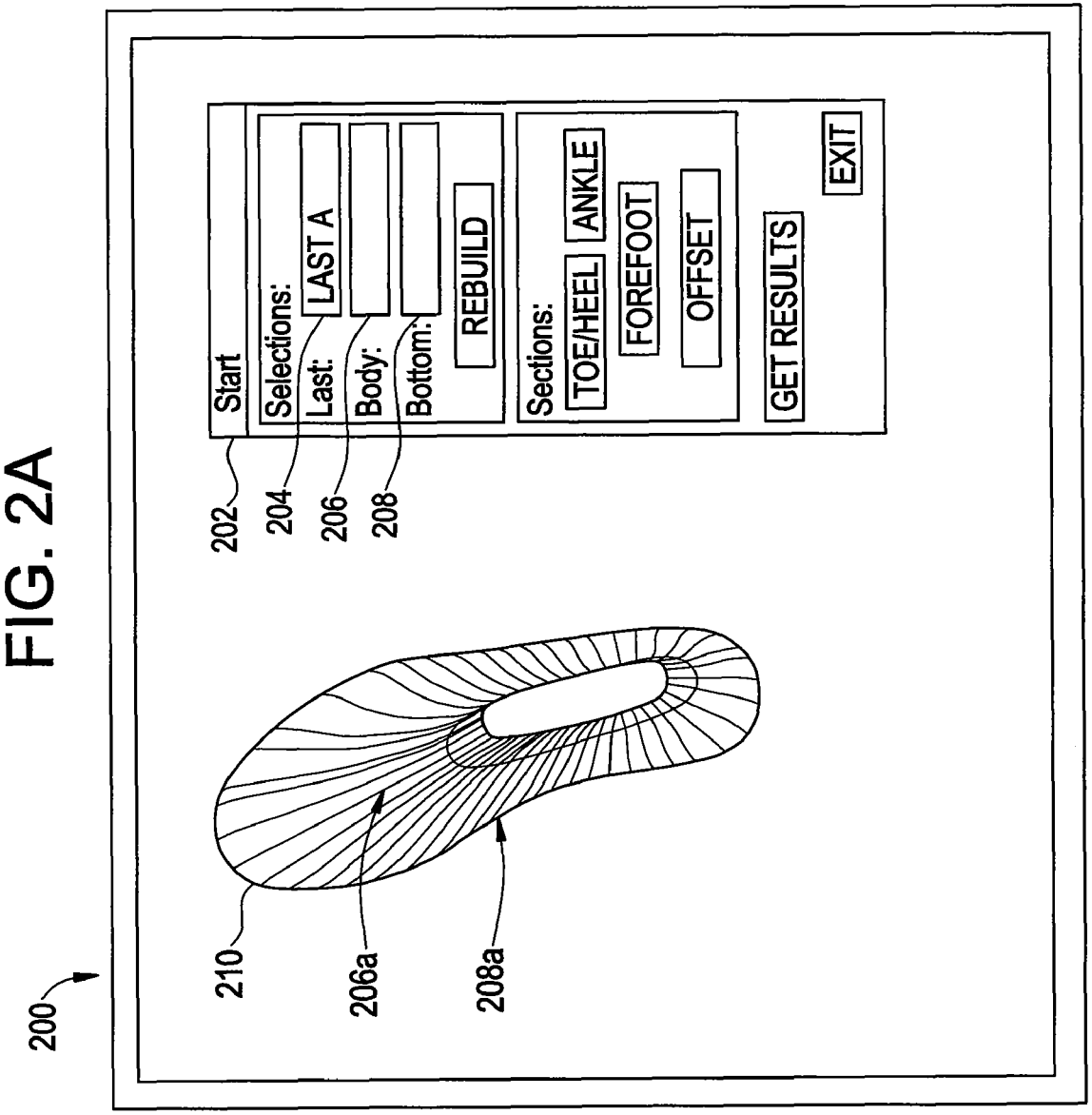
FIGS. 2A through 2Z illustrate various examples of user interface screens, features, generation of, and the use of three-dimensional design last systems and methods in accordance with examples of this invention.
Figure 2B:
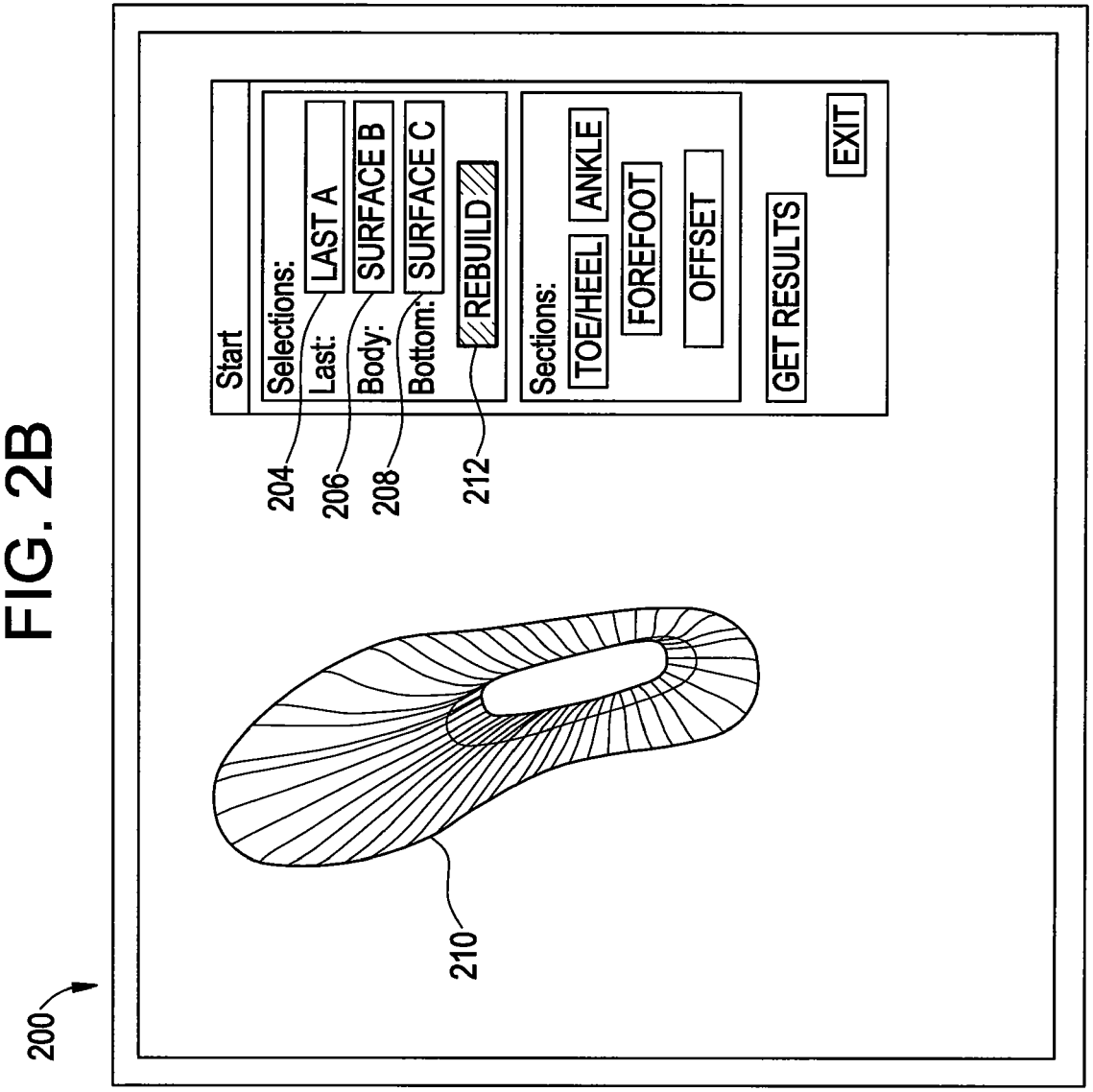
Figure 2C:
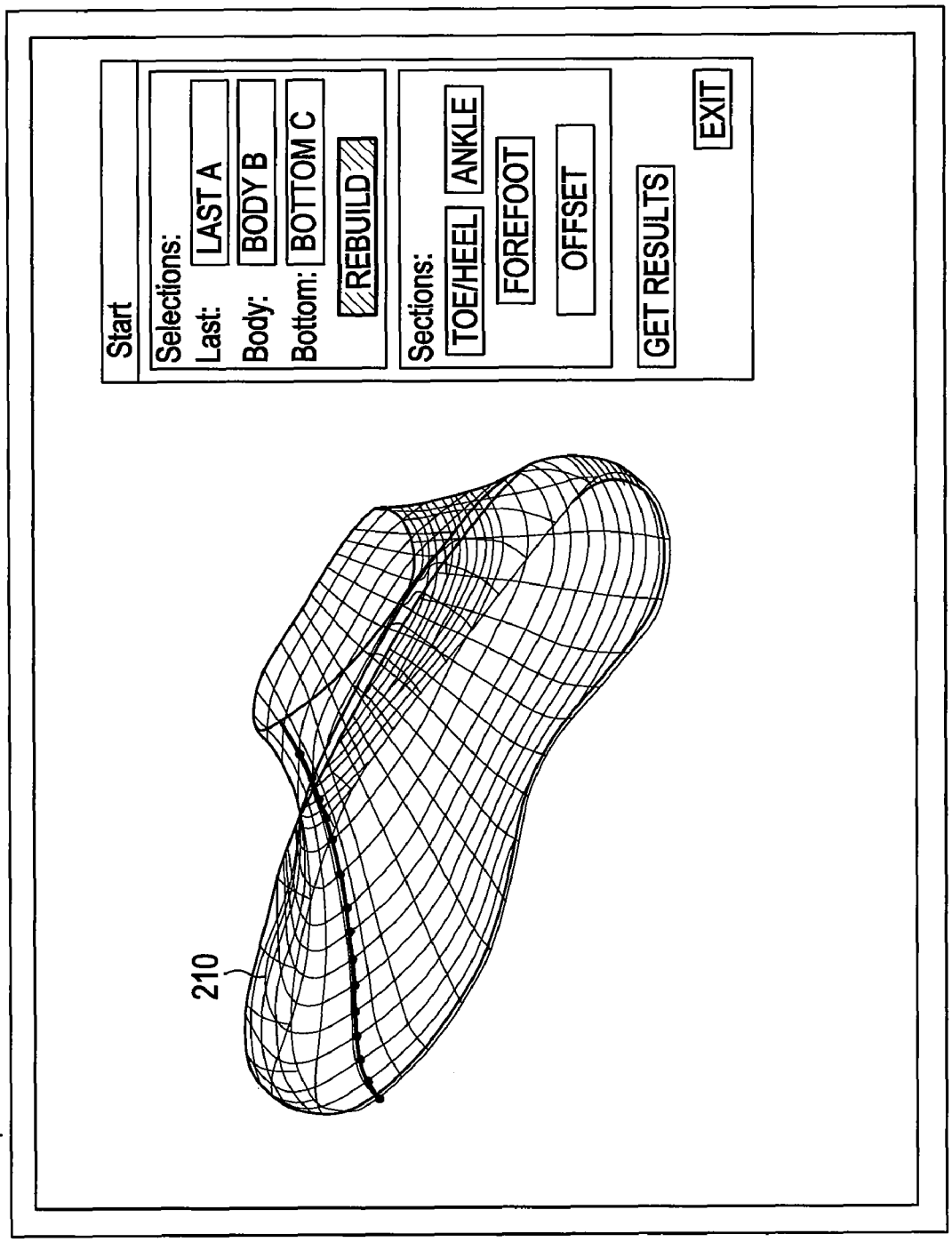
Figure 2D:
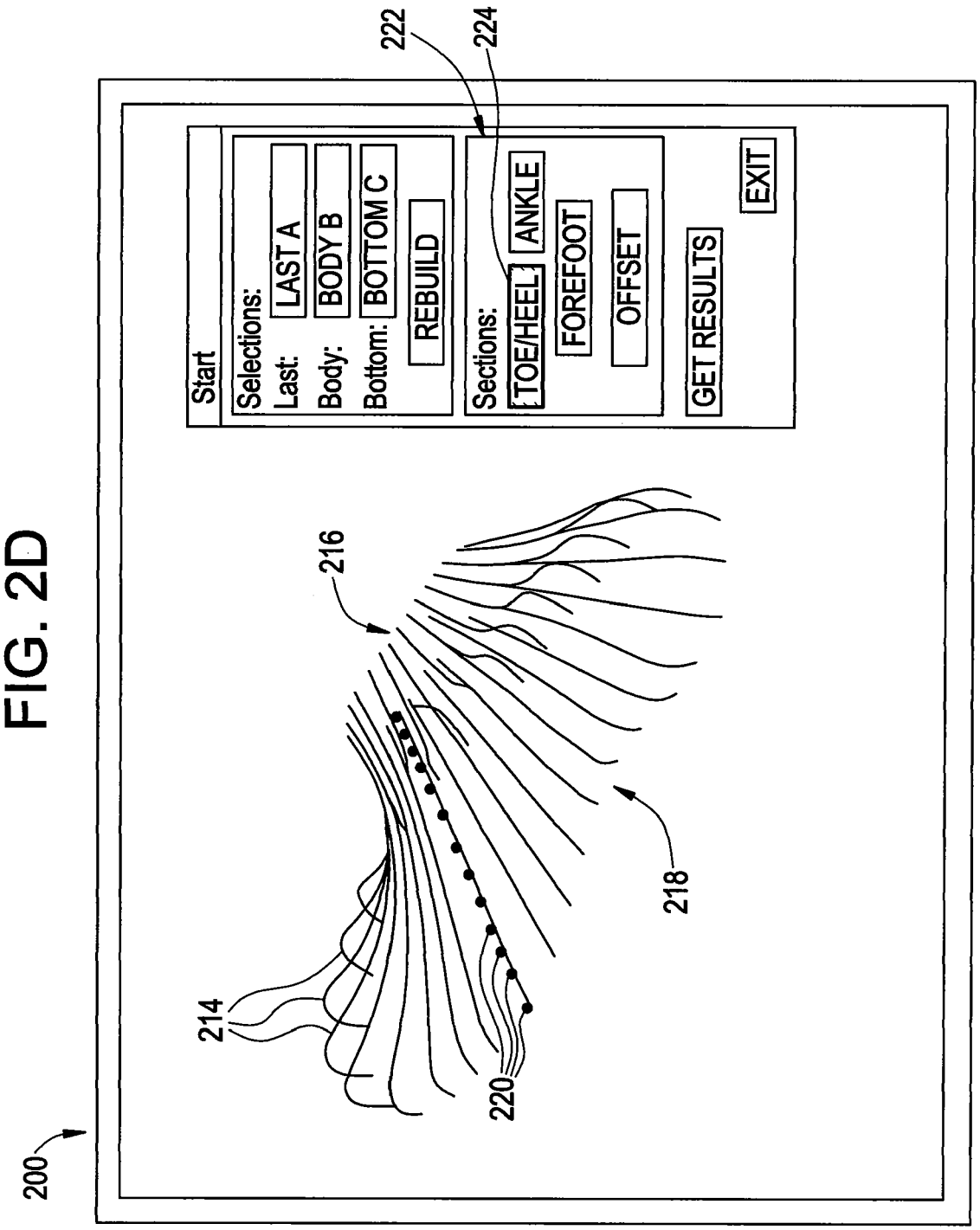
Figure 2E:
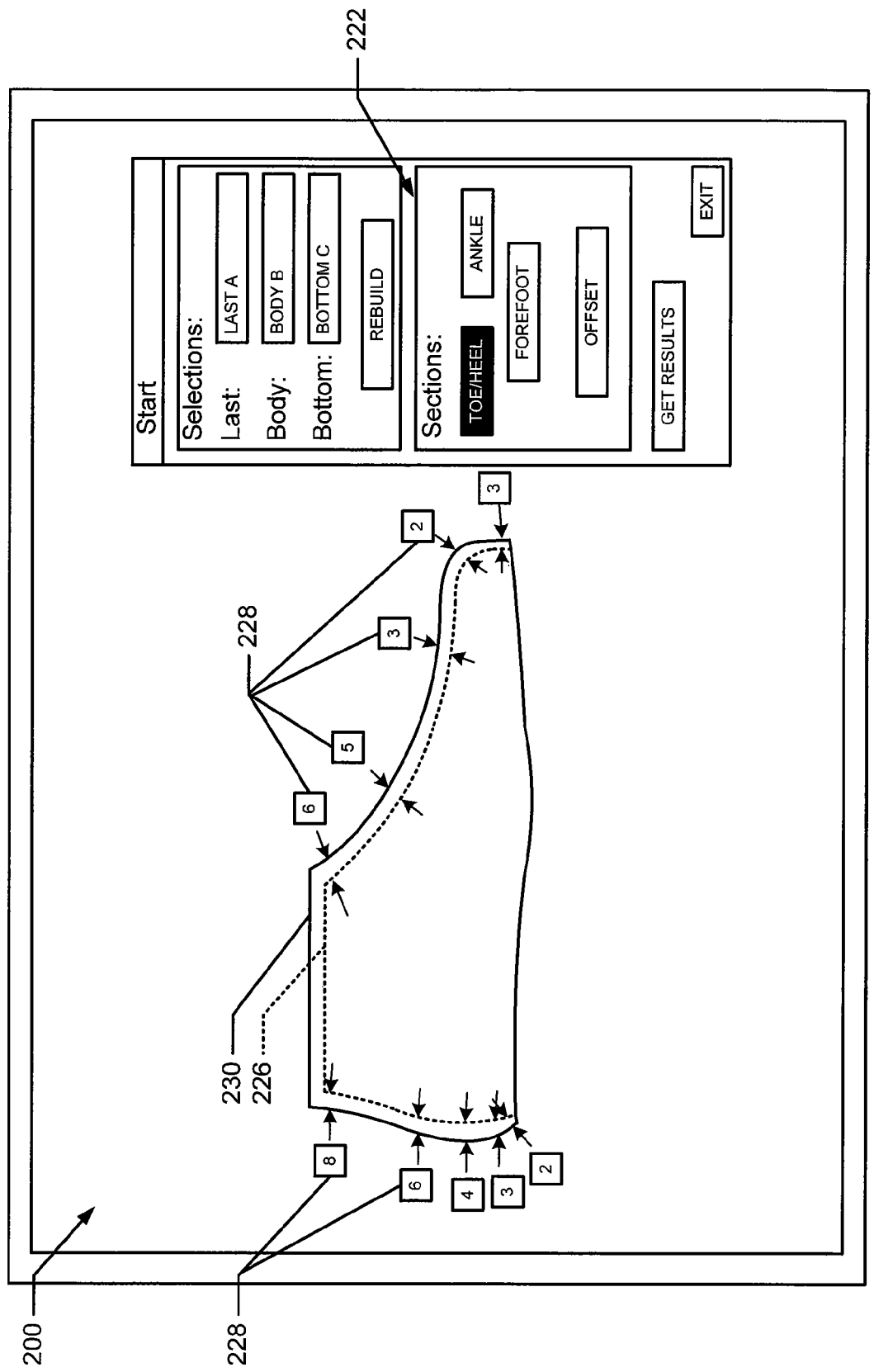
Figure 2F:
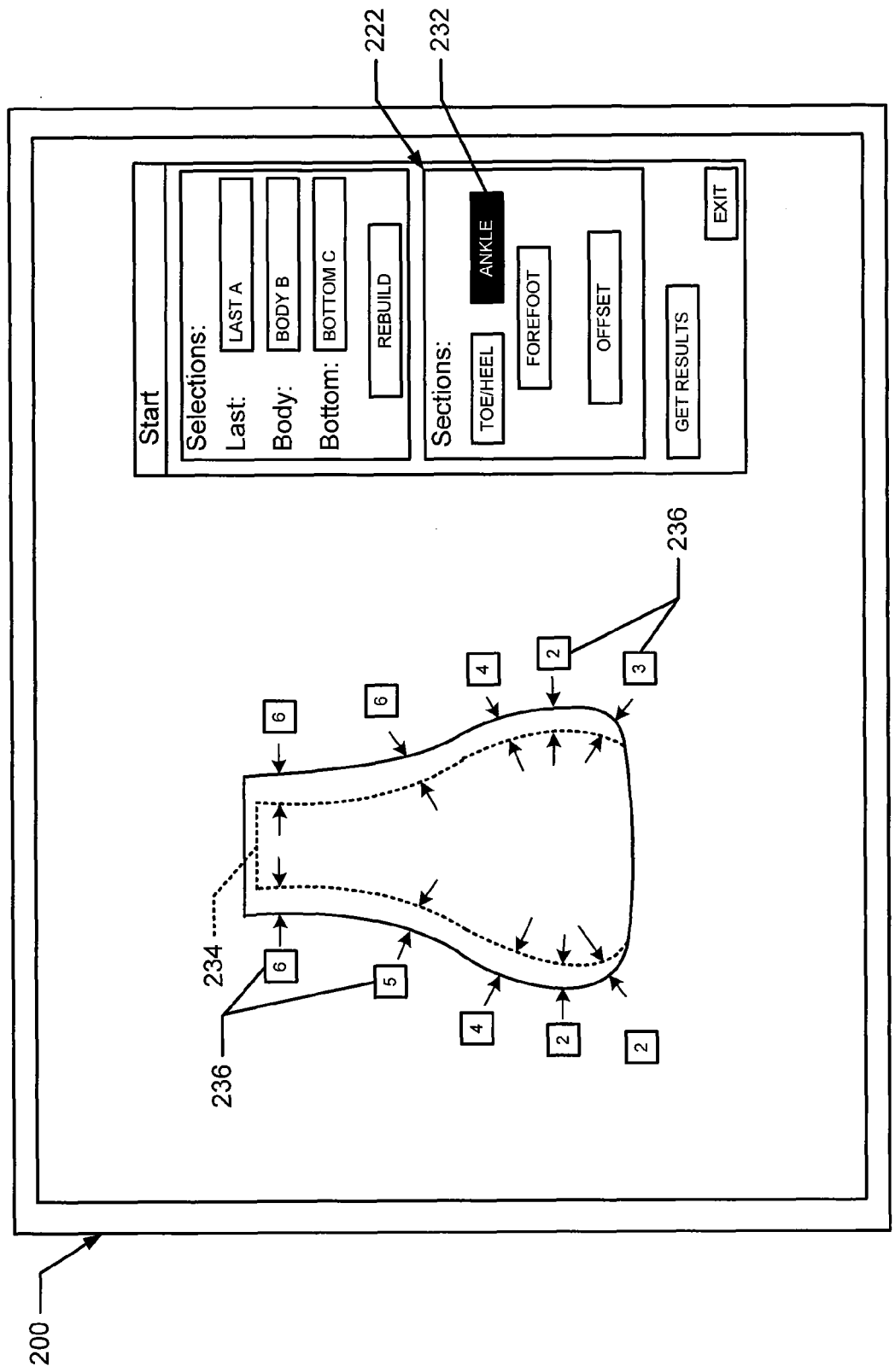
Figure 2G:
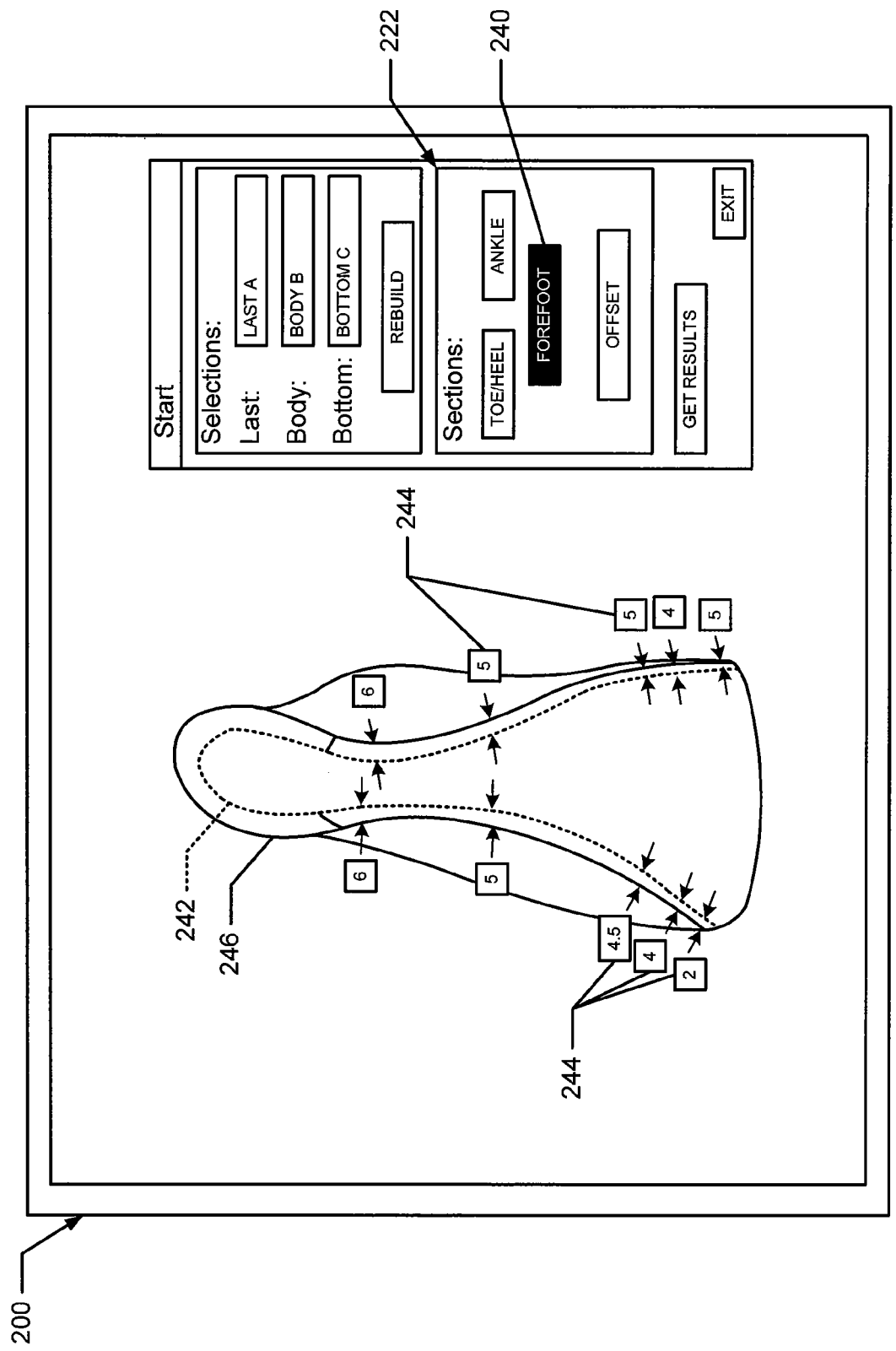
Figure 21:
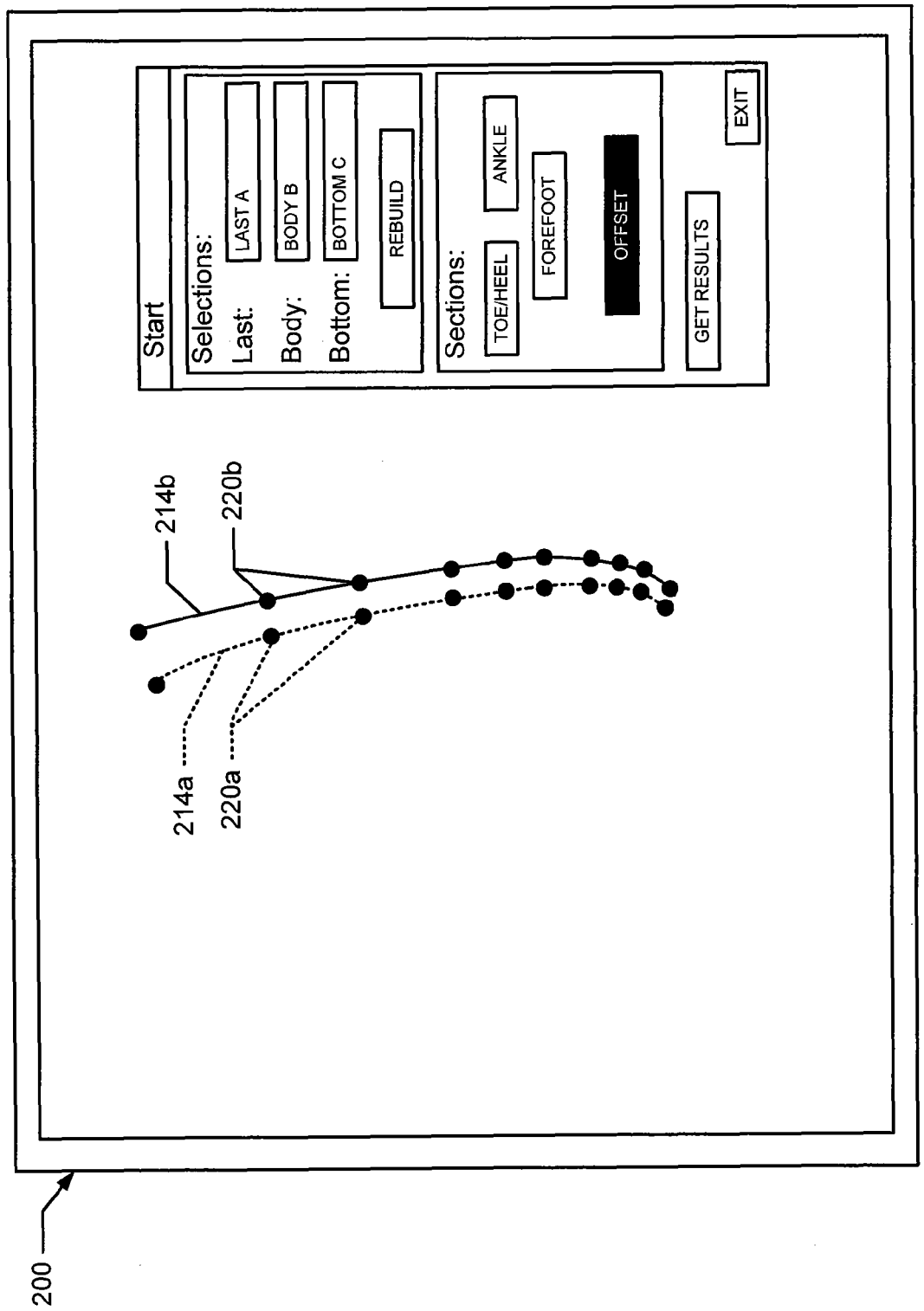
Figure 2J:
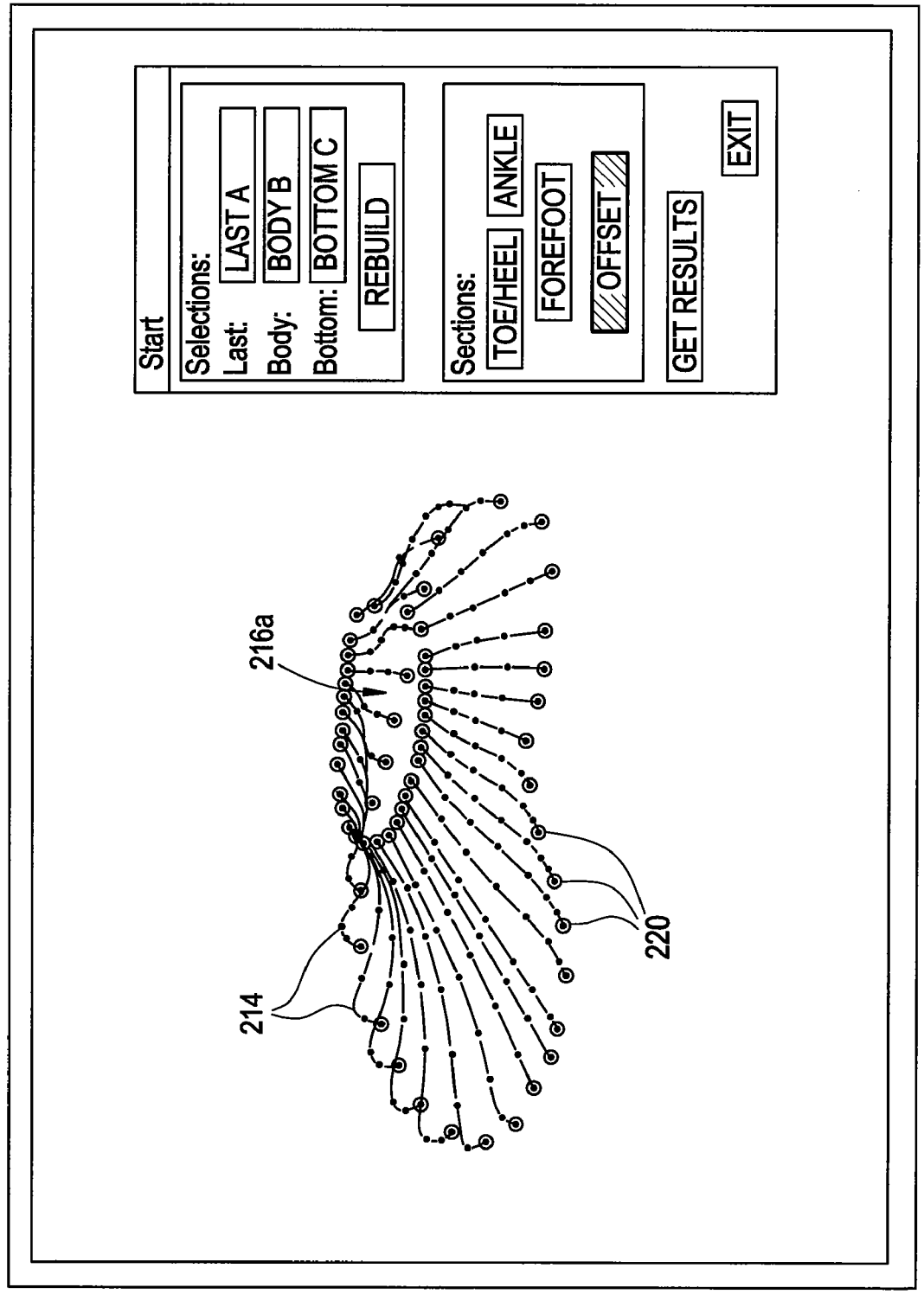
Figure 2K:
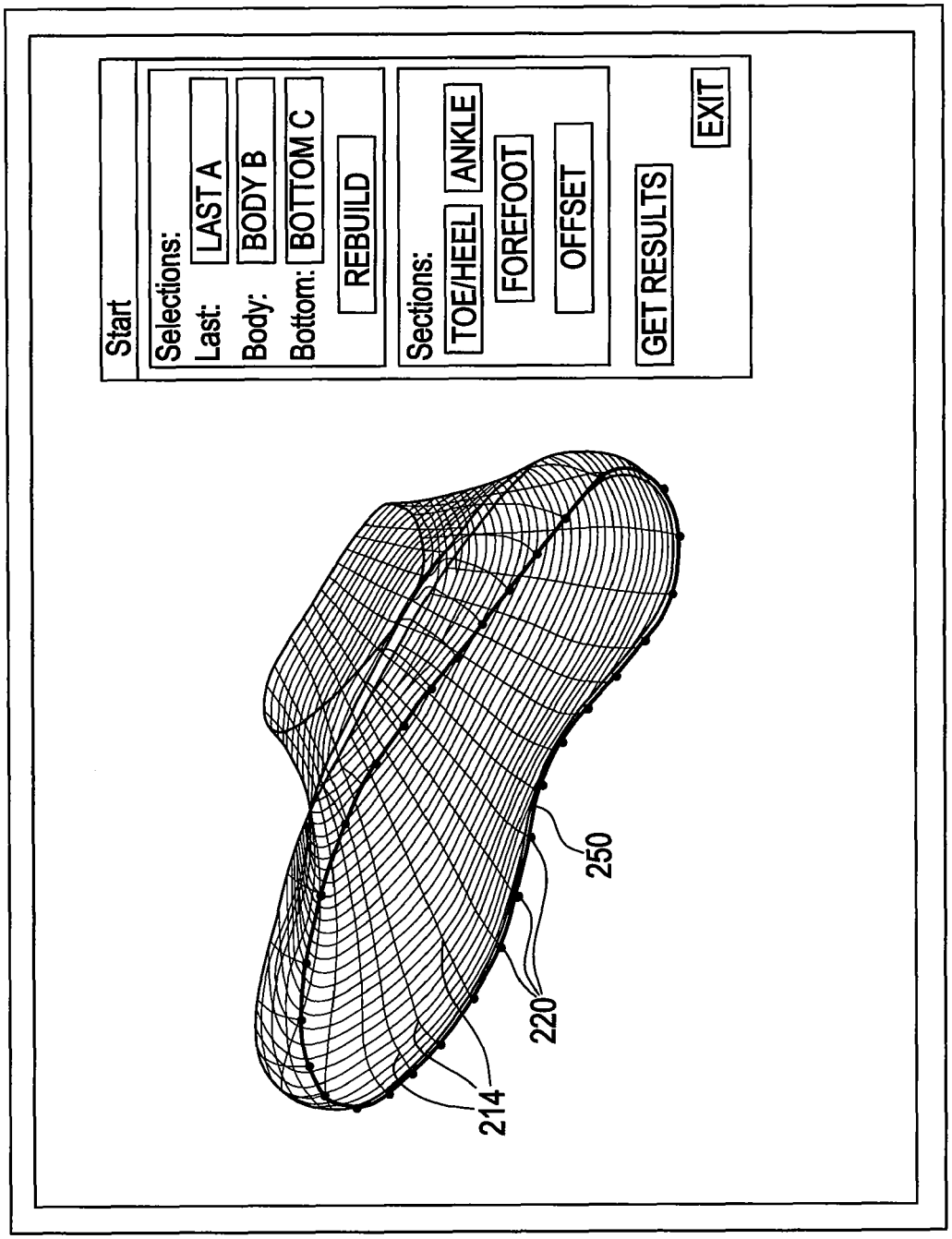
Figure 2L:
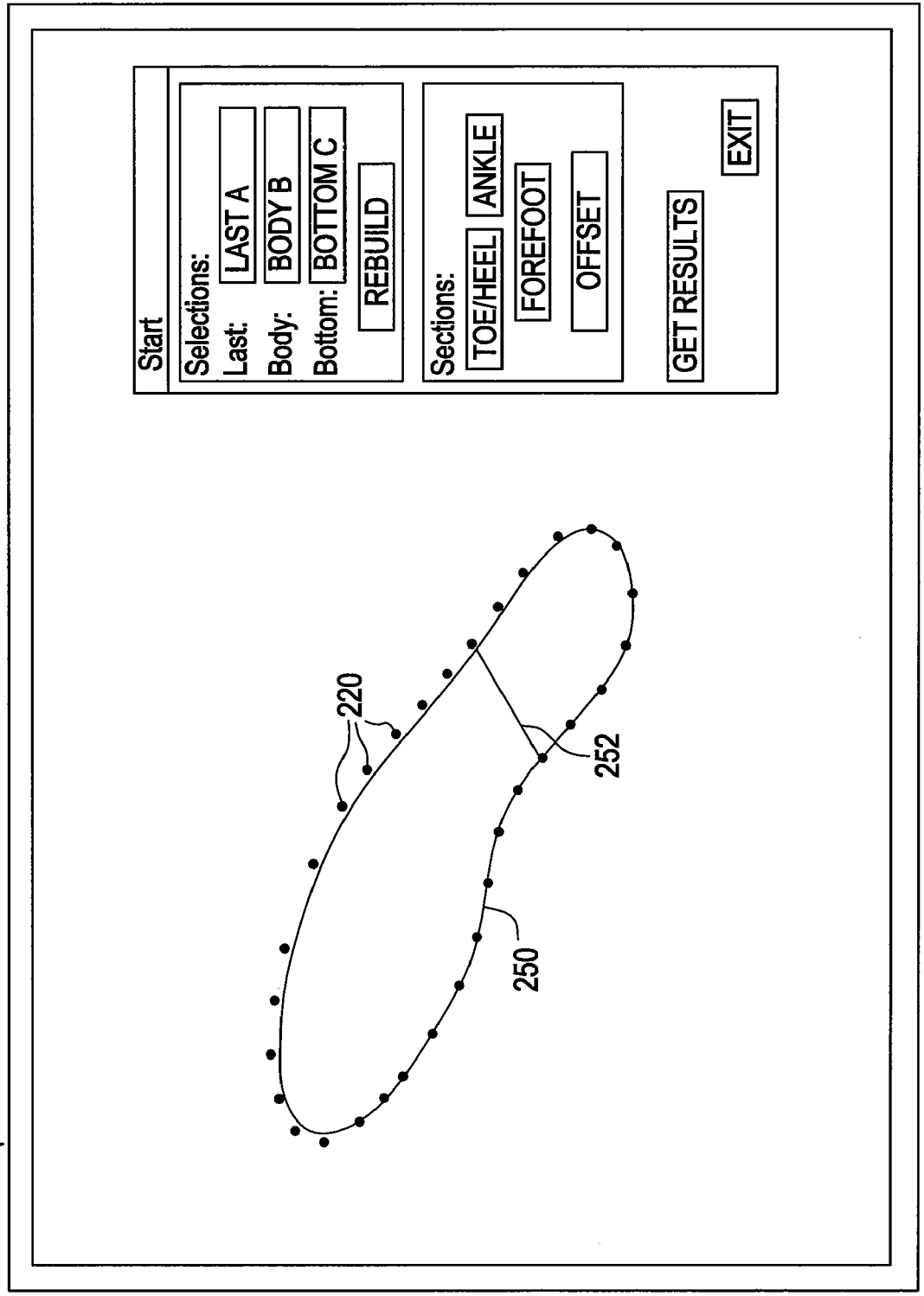
Figure 2N:
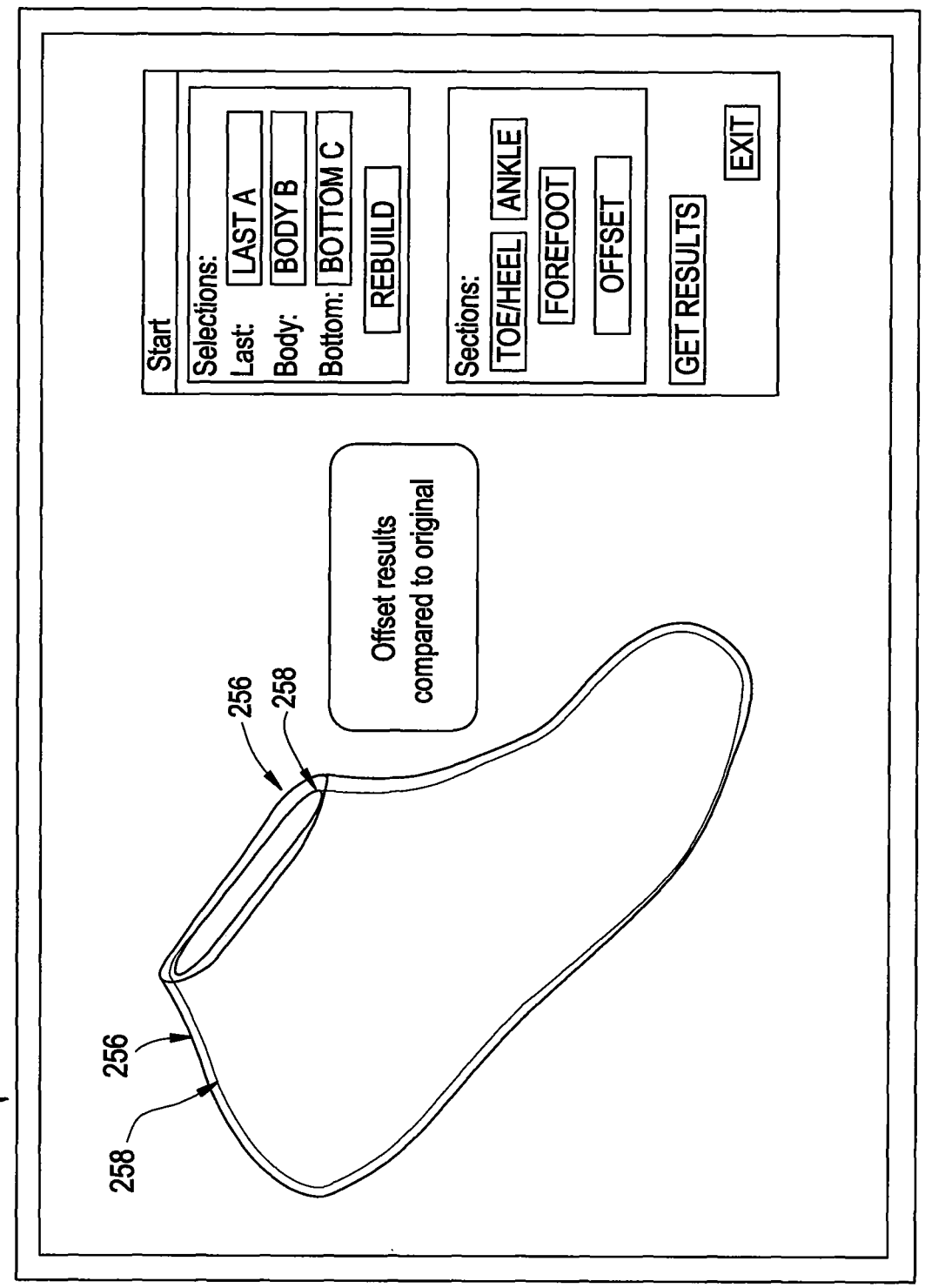
Figure 20:
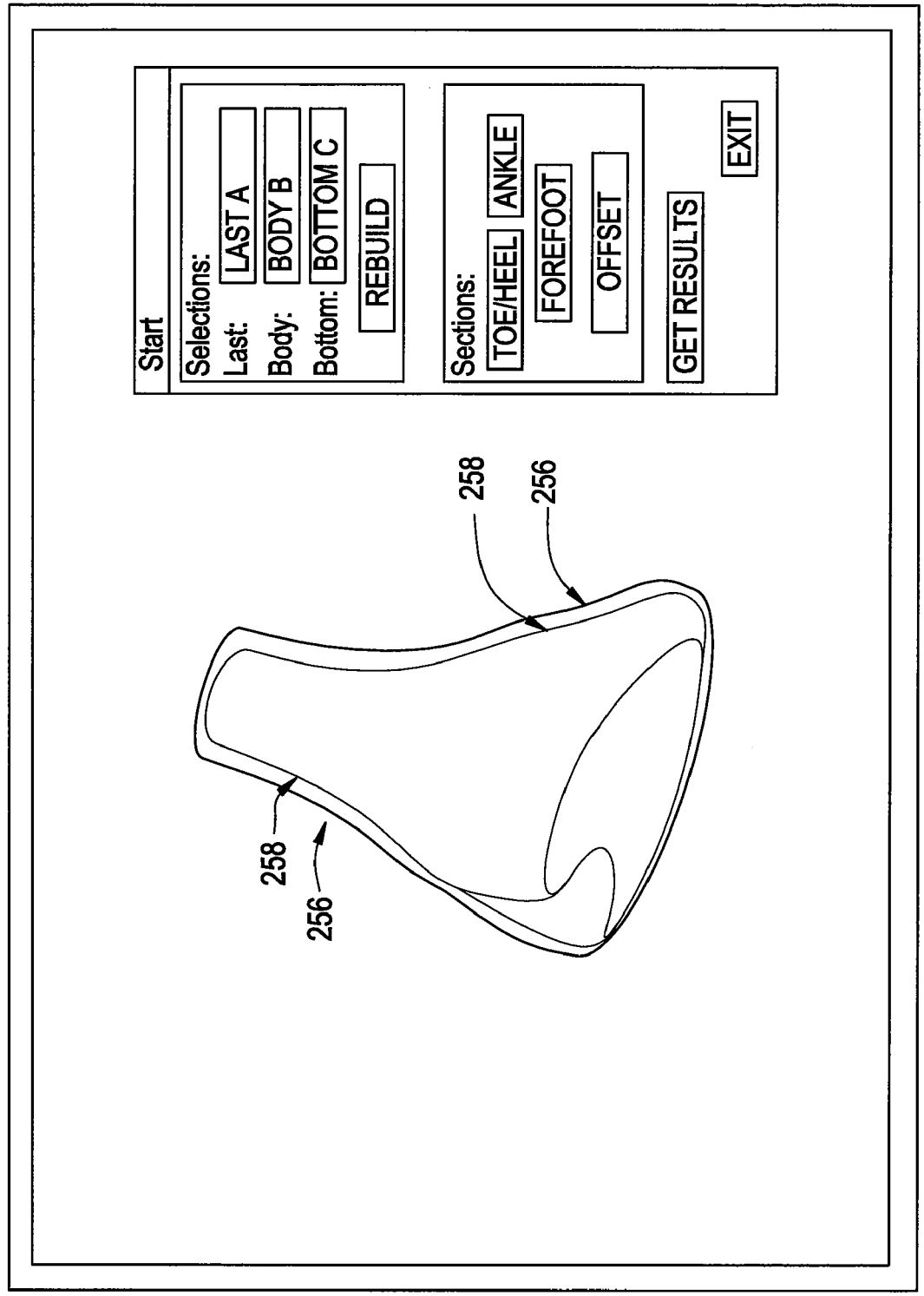
Figure 2P:
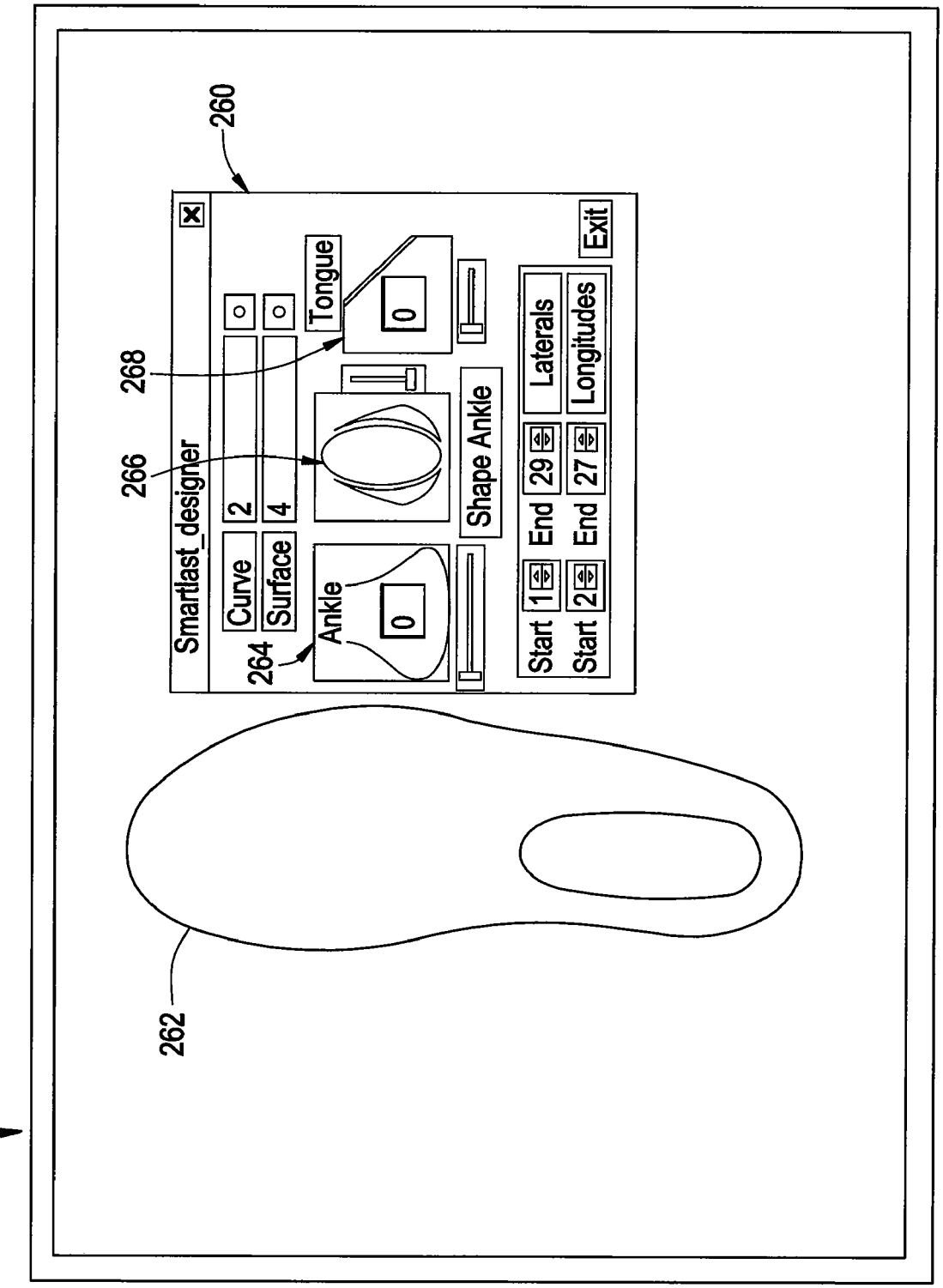
Figure 2Q:
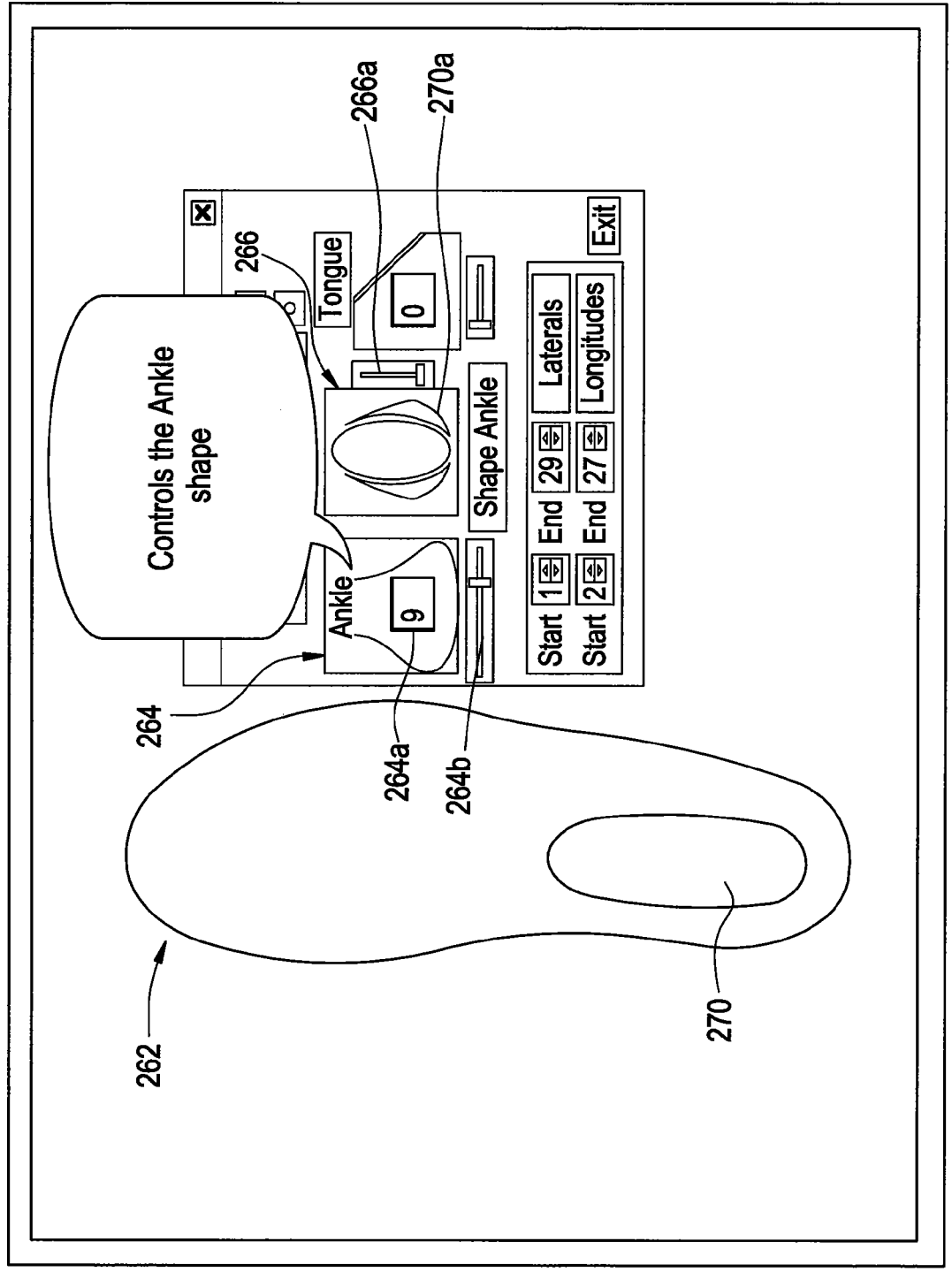
Figure 2R:
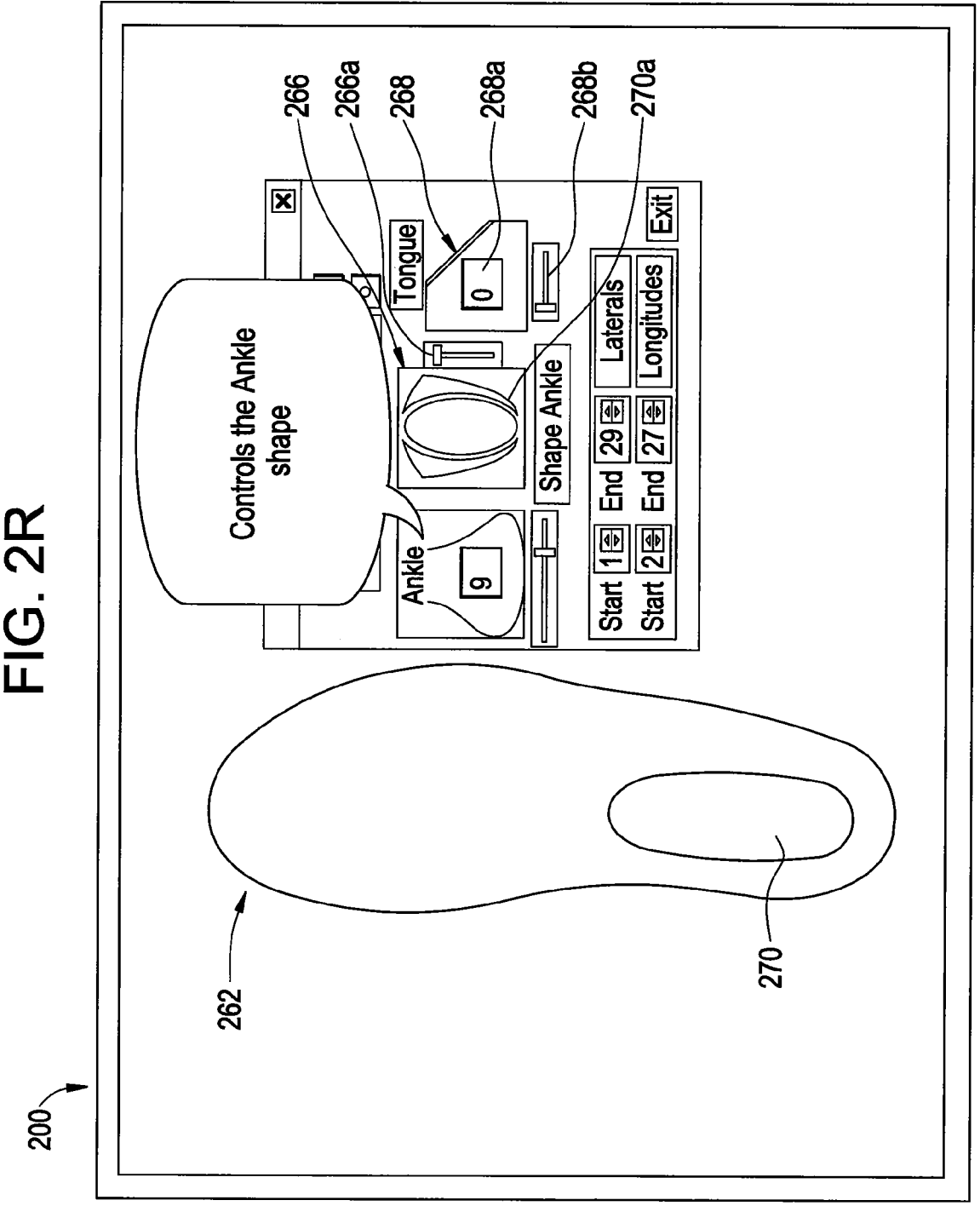
Figure 2S:
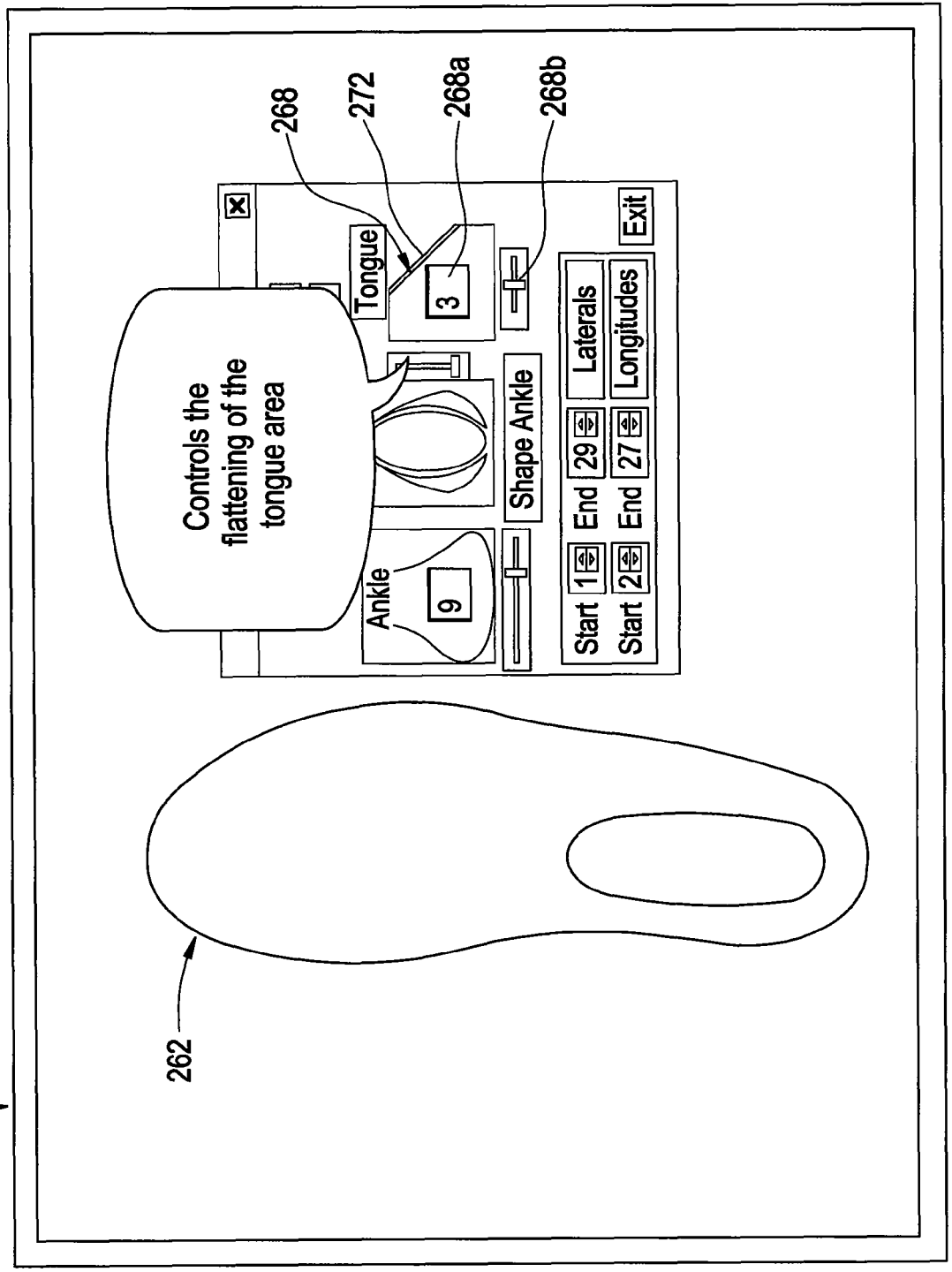
Figure 2W:
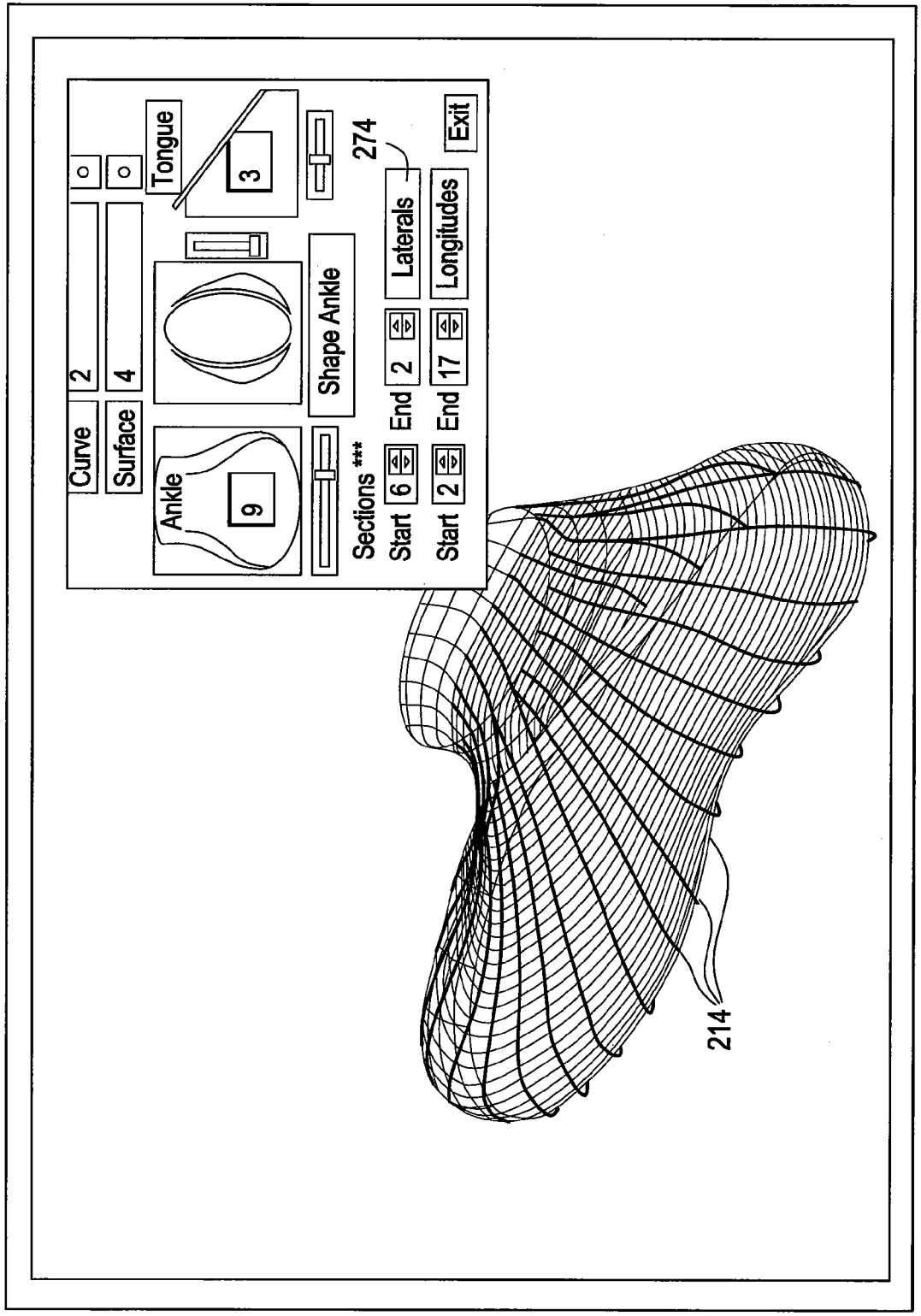
Figure 2X:
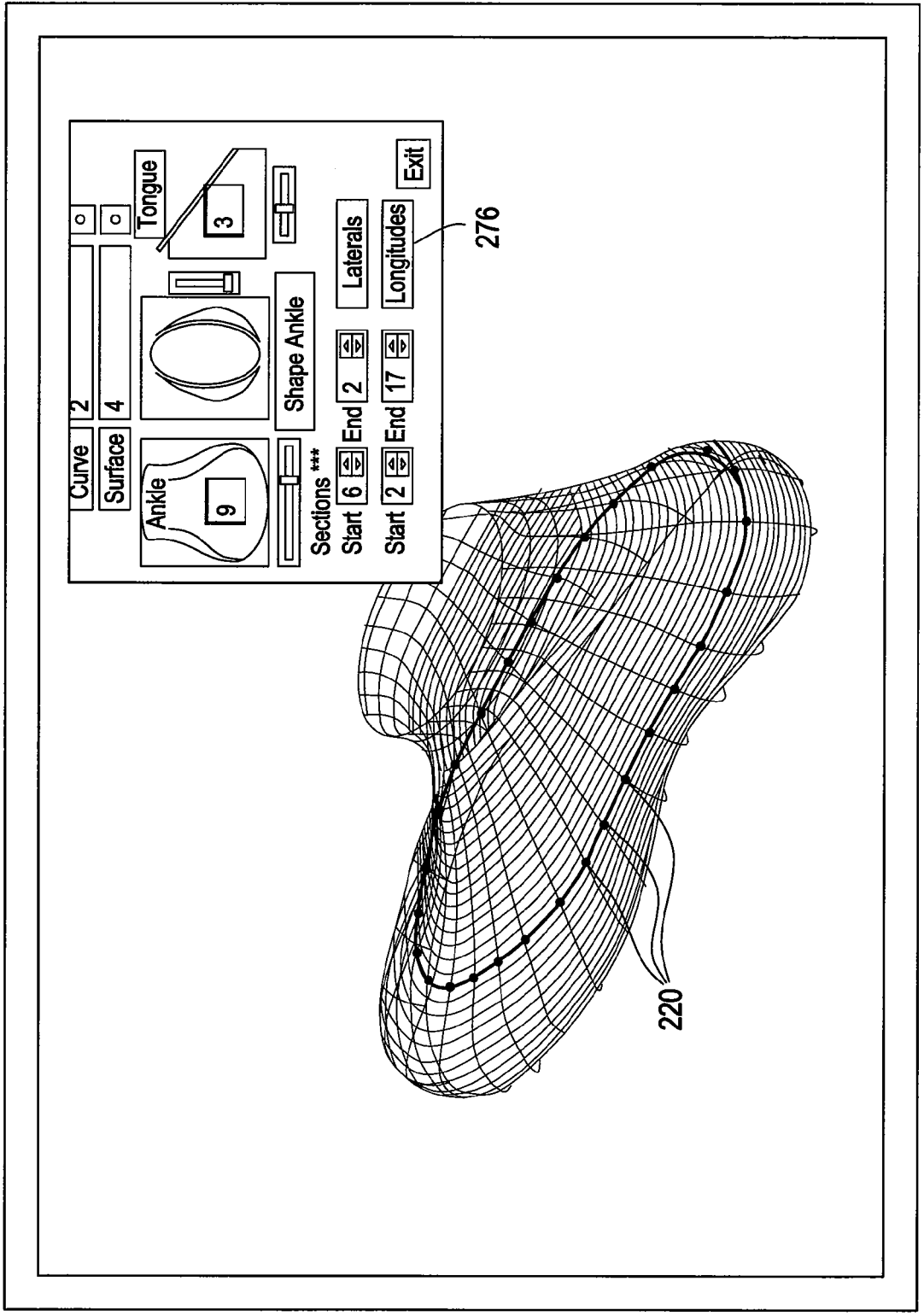
Figure 2Z:
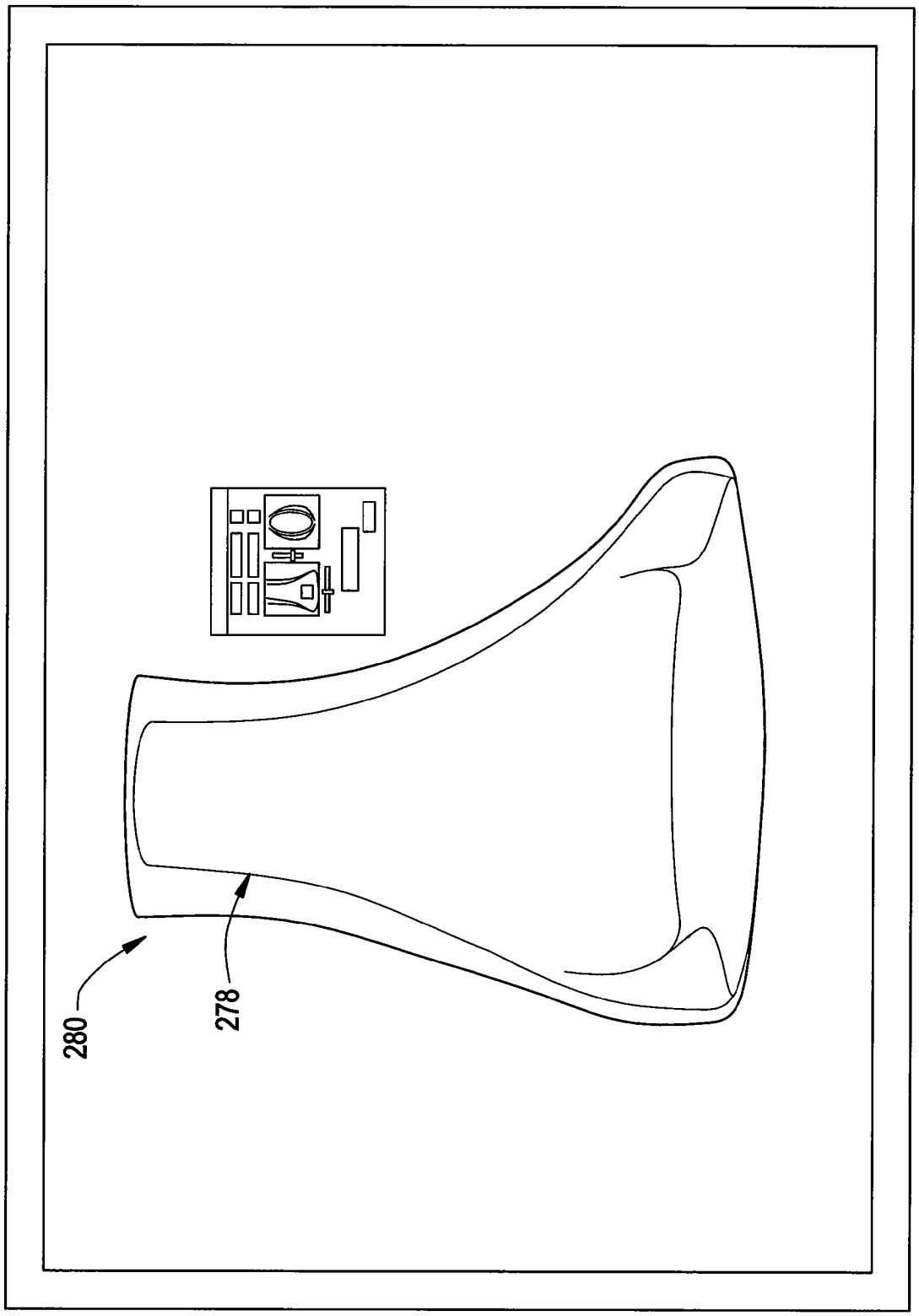

FIGS. 2A through 2Z illustrate examples of a user interface (e.g., in the form of screens from a graphical user interface) for operating and/or using three-dimensional design last systems and methods according to examples of this invention. A system or method need not provide all of these interface screens to fall within the scope of this invention. Rather, these screens are provided herein as an aid to describing and understanding example systems and methods according to this invention. In systems and methods in accordance with at least some examples of this invention, the design of a three-dimensional design last begins with a conventional three-dimensional last structure, e.g., of the types available in commercial products from commercial suppliers, such as PROCAM, CRISPEN (or DELCAM-CRISPIN), DELCAM POWERSHAPE, IGES, etc. In this manner, the footwear designer can initiate his/her footwear design effort by selecting a CAD type representation of a desired last for the final shoe product (e.g., the specific last structure that will be used in finally manufacturing the shoe), which helps assure that the final shoe product will properly fit and be properly formed on the physical last when the design is completed.

FIG. 2A illustrates an example user interface display 200 as an example design process may begin (e.g., as generated by a computer system 100 on a display device 108, as illustrated in FIG. 1). In this example interface display 200, the user is prompted to input various information to start the procedure. These prompts are provided via an input box 202 in this example interface 200. First, the user is asked to select a specific physical last element desired for this footwear design. This may be accomplished, for example, by the user inputting data into the "last" input box 204. While any desired manner of user interaction with the interface 200 may be used without departing from this invention, in this illustrated example, the input box 204 may directly accept user input (e.g., via a keyboard or other input device). As another example, if desired, interaction with input box 204 may provide the user with access to a listing or library of available last designs or structures (such as a menu listing, a drop down menu, etc., of different specific last structures that are available, different sizes of lasts, etc.).

Additionally, as illustrated in FIG. 2A, selection of a "last" identifier may cause a virtual representation of the last, e.g., a three-dimensional last structure 210, to appear in the user interface screen 200. In order to provide information for further processing by the computer system, at this stage in the process a user may be prompted to identify various features of the three-dimensional last structure 210. For example, as illustrated in FIG. 2A, a user may be prompted to identify (or select) the surface of the illustrated three-dimensional last structure 210 that represents the main body 206a of the last structure 210. Similarly, a user may be prompted to identify (or select) the surface of the illustrated three-dimensional last structure 210 that represents the bottom surface 208a of the last. Once selected, if desired, identifying information relating to these surfaces may appear in the respective identifying boxes 206 and 208, respectively, as shown in FIGS. 2A and 2B. Identification of these surfaces can help processing to locate various curves and/or control points thereof, as will be described in more detail below (e.g., when creating the three-dimensional design last, when rendering the last, etc.).

Selections of the various surfaces may be made in any desired manner without departing from this invention. For example, a user may click on a point on the surface one or more times to highlight the desired surface to be identified, and once the desired surface has been highlighted, the user may click on the desired box 206 or 208 to indicate whether that surface represents the body (box 206) or the bottom (box 208). For points of the display 200 that include multiple layers of surfaces (e.g., where the bottom surface is at least partially obscured by the top surface), plural clicks of the mouse may be used to toggle through the various surfaces present at the selected point. As another example, lasso or other selection features may be used to select and identify a specific surface. A stylus also may be used to make any necessary or desired selections, e.g., in a conventional manner, such as by tapping the stylus on the digitizer screen, by a press-and-hold action, etc. As still another example, if desired, systems and methods according to at least some examples of this invention may automatically identify the various surfaces of the three-dimensional design last 210, for example, by associating the largest continuous surface (or a substantially curved continuous surface) with the main body of the last and/or by associating the smaller continuous surface (or a substantially flattened continuous surface) with the bottom surface. As yet another example, if the data associated with the three-dimensional design last 210 already identified the desired surfaces in some manner (e.g., via the commercially available last packages), further selection or identification of the various surfaces (e.g., body surfaces and/or bottom surfaces) may by unnecessary.

FIG. 2B illustrates an example user interface display 200 with these user inputs/selections entered ("Last A," "Body Surface B," and "Bottom Surface. C" were selected and identified via input boxes 204, 206, and 208, respectively, in this illustrated example). As noted above, selecting the last structure (via input box 204) will bring up an initial three-dimensional last structure 210 (e.g., from a commercially available computer-aided design package, such as those described above). Then, by selecting the "Rebuild" button 212, this initial three-dimensional last structure 210 will be "rebuilt" into a format that will allow further manipulation and modification of the size, shape, and/or other features of the last structure 210 in a manner that will be described in more detail below. In this illustrated example system and method, the original three-dimensional last structure 210 is converted to a series of curves that represent the selected three-dimensional last structure, optionally taking into account at least some of the other user selected or identified features and/or inputs, such as the body surface and/or the bottom surface, as described above. As illustrated in FIGS. 2C and 2D, using the data representing the surface of the original last structure 210 (as represented in FIG. 2C), systems and methods according to at least some examples of this invention redefine and represent the body surface of this last as a series of spaced curves 214 that extend around the last structure (as shown in FIG. 2D). In this illustrated example, each individual curve 214 extends along the upper portion of the last structure from the ankle opening area 216 to the bottom surface or sole area 218 (with the curves 214 representing the exterior body surface of the last).

Systems and methods according to the invention may convert the original three-dimensional last structure 210 into any desired number of spaced curves 214 without departing from this invention. Generally, however, providing too many curves 214 or too few curves 214 may produce a "non-smooth" appearing surface and/or may require excessive processing time (e.g., for various processing steps, such as surface smoothing steps to be described in more detail below). In some examples of this invention, from 20-50 curves 214 will be provided around the circumference of the overall three-dimensional last structure, and in still other examples, from 22-45 curves 214, or from 25-40 curves 214, or even from 27-36 curves will be used. In some specific examples of systems and methods according to this invention, 29 and 32 curves 214 may be used. The number of curves 214 used also may depend on various other factors, such as shoe/last size, the resolution requirements needed for designing the footwear, resolution of the computer display available, etc.

FIG. 2D illustrates each of the various curves 214 extending all of the way along the three-dimensional last body surface from the ankle opening area 216 to the sole area 218 (or bottom surface). This is not a requirement. Rather, if desired, some of the curves 214 may extend this entire length while other (e.g., "interstitial" curves) may extend only some portion of this distance (e.g., to provide more detail in certain regions of the last, etc.). As another example, if desired, independent sets of curves may be provided for different regions of the last, such as one set of curves for the ankle area, one set for the instep area, and/or one step for the sole area, etc. Other combinations of curves and/or curve arrangements are possible without departing from this invention.

Each individual curve 214 in this example system and method may be designed to include a plurality of "control points" 220 (see FIG. 2D). As will be described in more detail below, these "control points" 220 may be used (both by the computer system and the user) to control locations of various points on the three-dimensional design last structure as the user further modifies the original three-dimensional last structure to produce the desired last design structure. While each curve 214 may include the same number of control points 220, this is not a requirement. Moreover, the system may track the locations of the control points 220 (e.g., the relative locations of each control point 220, their actual locations on the screen, etc.).

Accordingly, at this point in the design process, systems and methods in accordance with at least some examples of this invention will have data available representing the original last structure (optionally with some modifications thereto, e.g., from the user input data or other information indicating the footwear body type and/or from the user input data or other information indicating the bottom type, in this example), in the form of data representing the separate curves 214 and their associated control points 220. While generally appearing like a human foot and/or the interior of a shoe structure, conventional last structures for use in manufacturing footwear (and their three-dimensional representations from commercial computer-aided last design packages) have some significant differences from the appearance of the footwear upper to be designed. For example, the surface of the last most closely represents an interior surface of an article of footwear that may be produced using the last (and it may be somewhat inwardly contoured from that structure). The surface of the last does not necessarily track the size and shape of the outer surface of an upper material from which an article of footwear is to be made using the last (and on which various design features of the upper may be located). Moreover, the ankle shape of a conventional last is typically long and narrow, quite narrow as compared to a typical ankle opening for an article of footwear. Additionally, the instep or tongue area of a conventional last often appears significantly steeper than that of a final desired shape of an instep or tongue area for many articles of footwear.

Accordingly, systems and methods according to examples of the invention allow user input to selectively "offset" or modify the shape of the three-dimensional last structure at this stage in the process to produce a modified last structure that more closely represents the surface of the upper material for the footwear to be designed. The "offset" data is used to effectively apply an additional "layer" of material (e.g., representing the thickness of the upper) or adjust the "thickness" of various portions of the three-dimensional last structure to more closely correspond to the surface of the upper. In accordance with examples of this invention, the surface of the last structure may be selectively "offset" such that different areas or regions of the original last structure are offset or thickened at different thickness levels to better represent the final desired thickness of the upper (and/or to better represent the final shape of the desired upper to be designed). In other words, systems and methods according to at least some examples of this invention will not simply apply a constant and uniform increased thickness across the entire original last structure in an effort to accommodate for the thickness of the upper material.

The figures illustrate various examples of a user interface for selectively adjusting the offset values for various regions or sections of the last structure. First, as illustrated in FIG. 2D, a "Section Offset" adjusting interface section 222 is provided with the user interface 200. As one step in this process, a user may elect to adjust the thickness (or the "offset") associated with the toe and heel regions of the last structure as provided at FIG. 2D (as shown by the highlighting of the "Toe/Heel" button 224 in FIG. 2D). This action brings up a user interface, e.g., of the type shown in FIG. 2E, which enables user adjustment of various features of the last's thickness. As shown, in this example interface, a side view of the original last structure 226 size and shape from FIG. 2D is shown (shown in broken lines in FIG. 2E), with various offset areas 228 provided in the heel, instep, and toe regions. The numbers in the offset areas 228 may represent the desired thickness (e.g., in millimeters, etc.) of the modified upper member design at this region, and a user may freely change any one or more of the thicknesses based on the specific design (e.g., by clicking on a box 228 or highlighting the number therein and entering a new number). Optionally, if desired, the computer system may initially populate these offset areas 228, e.g., with default settings, for example, based on the footwear body type, the material type, the footwear bottom type, the footwear sole structure, etc., and the user may be allowed to further adjust these offset thickness settings, if desired. The modified size and shape of the upper member may be represented in the interface as shown by the solid line 230 in this example interface display.

If desired, the locations of the various offset input areas 228 may correspond to locations of at least some of the control points 220 on one or more of the curves 214. For example, in the example shown in FIG. 2E, the illustrated heel curve (extending from the ankle opening to the sole area) may represent one of the curves 214 and the illustrated instep or tongue curve (extending from the ankle opening to the sole area) may represent another of the curves 214. The various offset input areas 228 on these curves may correspond to every other control point 220 location on the curves 214, and the system may locate the intermediate control points along the curves 214 (i.e., those not corresponding to an offset input area location 228) at desired intermediate locations between the offset input area 228 locations, e.g., at an average offset distance between the two bordering offset areas or control points. Offset input areas (e.g., 228) may be provided at the locations of any desired number of control points 220 without departing from this invention, and even at every control point location 220 without departing from the invention. Alternatively, if desired, the offset input area 228 locations need not directly correspond to the location(s) of any control point 220.

The upper thickness or "offset values" in other areas of the last structure also may be adjusted in systems and methods in accordance with at least some examples of this invention. As noted above, the ankle region of a conventional last typically is somewhat narrower than the desired appearance of a final upper design. FIG. 2F illustrates an example interface screen 200 for adjusting the ankle thickness or offset values. This interface screen is activated or accessed when the "Ankle" section button 232 is selected in offset input section 222 of the user interface 200. As shown, in this example interface, a rear or central sectional view of the original last structure 234 size and shape from FIG. 2D is shown (shown in broken lines in FIG. 2F), with various offset areas 236 provided along various points of the section. The numbers in the offset areas 236 may represent the desired thickness (e.g., in millimeters, etc.) of the modified upper member design at this region, and a user may freely change any one or more of the thicknesses based on the specific design (e.g., by clicking on a box 236 or highlighting the number therein and entering a new number). Optionally, if desired, the computer system may initially populate these offset areas 236, e.g., With default settings, for example, based on the desired footwear body type, the material type, the bottom structure, the sole structure, etc., and the user may be allowed to further adjust these offset thickness settings, if desired. The modified size and shape of the upper member may be represented in the interface as shown by the solid line 238 in this example interface display.

Again, if desired, the locations of the various offset input areas 236 may correspond to locations of at least some of the control points 220 on one or more of the curves 214. For example, in the example shown in FIG. 2F, the illustrated side curves (each extending from the ankle opening to the sole area) may represent one of the curves 214 of the body surface. The various offset input areas 236 on these curves may correspond to every other control point 220 location on these curves 214, and the system may locate the intermediate control points along the curves 214 (i.e., those not corresponding to an offset input area location 236) at desired intermediate locations between the offset input area 236 locations, e.g., at an average offset distance between the two bordering offset areas or control points. Offset input areas (e.g., 236) may be provided at the locations of any desired number of control points 220 without departing from this invention, and even at every control point location 220 without departing from the invention. Alternatively, if desired, the offset input area 236 locations need not directly correspond to the location(s) of any control point 220.

Systems and methods in accordance with at least some examples of this invention may allow still further adjustments of the upper thickness or "offset values." For example, areas of the forefoot of the upper may differ significantly in size and/or shape from the last structure. FIG. 2G illustrates an example interface screen 200 for adjusting the forefoot thickness or offset values. This interface screen is activated or accessed when the "Forefoot" section button 240 is selected in offset input section 222 of the user interface. As shown, in this example interface, a forefoot sectional view of the original last structure 242 size and shape from FIG. 2D is shown (shown in broken lines in FIG. 2G), with various offset areas 244 provided along the section (this section may be vertical or angled and located at any desired position along the ankle, instep, or tongue regions). The numbers in the offset areas 244 may represent the desired thickness (e.g., in millimeters, etc.) of the modified upper member design at this region, and a user may freely change any one or more of the thicknesses based on the specific design (e.g., by clicking on a box 244 or highlighting the number therein and entering a new number). Optionally, if desired, the computer system may initially populate these offset areas 244, e.g., with default settings, for example, based on the desired footwear body type, the material type, the bottom structure, the sole structure, etc., and the user may be allowed to further adjust these offset thickness settings, if desired. The modified size and shape of the upper member may be represented in the interface as shown by the solid line 246 in this example interface.

Again, if desired, the locations of the various offset input areas 244 may correspond to locations of at least some of the control points 220 on one or more of the curves 214. For example, in the example shown in FIG. 2G, the illustrated side curves (each extending from the ankle opening to the sole area) may represent one of the curves 214 of the body surface. The various offset input areas 244 on these curves may correspond to every other control point 220 location on these curves 214, and the system may locate the intermediate control points along the curves 214 (i.e., those not corresponding to an offset input area location 244) at desired intermediate locations between the offset input area 244 locations, e.g., at an average offset distance between the two bordering offset areas or control points. Offset input areas (e.g., 244) may be provided at the locations of any desired number of control points 220 without departing from this invention, and even at every control point location 220 without departing from the invention. Alternatively, if desired, the offset input area 244 locations need not directly correspond to the location(s) of any control point 220.

Any desired number of offset areas (e.g., 228, 236, 244) and/or offset interface screens and/or offset sections or locations may be provided without departing from the invention.

Once the desired offset values are entered for the various zones and regions, users may elect to generate a modified last structure (e.g., a three-dimensional design last) that takes into account the input offset values. This may occur automatically, or in this illustrated example, by activating the "Offset" button 248 in the offset input section 222 of the user interface, as shown in FIG. 2H. This feature begins altering the locations of the various control points 220 on the individual curves 214 to reposition the control points 220 and curves 214 based on the input offset values. This is illustrated in FIG. 2I by a shifting of an individual curve 214 from its original position (214a, shown as a broken line) to a modified position (214b, shown as a solid line) by shifting individual control points 220 from their original positions 220a to modified positions 220b. This process may be repeated, optionally plural times, for all of the curves 214 extending around the original last structure.

If desired, in the example structure shown in FIG. 2I, the locations of at least some of the control points 220 along a curve 214 may be (at least initially) fixed based on the offset input values input by the user. For example, in the curve 214 shown in FIG. 2I, the initial position of every other control point 220 along line 214 may be initially set based on offset input values 228 from one of FIGS. 2E, 2F, and/or 2G, and the locations of the control points 220 between these set control points may be determined by the system (e.g., offset at an average distance between the surrounding two control points, at a position to make a smooth curve, etc.).

FIG. 2J illustrates an example view of the initial results of this offsetting process. As shown, the locations of the curves 214 and control points 220 are adjusted based on the input offset values to produce an enlarged or "thickened" structure as compared to the original three-dimensional design last. Notably, for example, the ankle region 216a of this structure in FIG. 2J more closely resembles the size of an ankle region of an article of footwear (with a larger opening—compare with FIGS. 2B and 2C). From the curve 214 data, if desired, systems and methods in accordance with at least some examples of this invention may generate representations of the footwear upper surface on the computer screen, e.g., as illustrated in FIG. 2K. This may be accomplished, in any desired manner, for example, by providing smoothed lines or curves interconnecting corresponding control points 220 on adjacent curves 214 (i.e., longitudinal curves), by providing lines interconnecting adjacent curves 214 at one or more locations between control points 220 on a given curve 214, etc. The surface lines may be generated, if desired, to help users better visualize, in three-dimensions, the surface size and shape of the modified last structure, even if generation of such a surface is not necessary at this time in the process.

At this point in this example process, the bottom surface of the modified three-dimensional last structure may be prepared. FIGS. 2K and 2L illustrate a curve 250 connecting the bottommost control points 220 on each curve 214 of the modified three-dimensional last structure (i.e., at the sole or bottom area). From this information, additional curves 252 representing the bottom surface of the design last may be generated, e.g., by connecting control points 220 located on opposite sides of the curve 250 (e.g., starting from the center, rear heel control point or the center, front toe control point, connecting opposing medial and lateral side control points, etc.). The shapes of the curves 252 may be adjusted depending at least in part, for example, on the desired bottom surface design (e.g., based on a single lasting arrangement, a double lasting arrangement, inclusion of an additional element at the bottom, etc.). Additionally or alternatively, if desired, a user may be given an opportunity to adjust the offset, thickness, or other aspects of the position of the bottom surface (or the curves 252 relating thereto), e.g., using an interface similar to those shown in FIGS. 2E, 2F, and 2G and/or those that will be described in more detail below in conjunction with FIGS. 2P through 2S. FIG. 2M illustrates an example of a final representation of the bottom structure 254 with plural medial-to-lateral side curves 252 and the outer curve 250.

As noted above, if desired, the curves 214 representing the body surface of the three-dimensional design last and the curves 252 representing the bottom surface thereof may share a common control point 220. For example, the bottom control point 220 of curves 214 may correspond to the side edge control points 220 of the curves 252. If desired, however, other arrangements of the control points (including separate control points for the curves 214 and 252) may be provided without departing from this invention.

FIGS. 2N and 2O illustrate the modified three-dimensional last structure (the outer curves or surfaces 256) as compared to the original three-dimensional last structure (the inner curves or surfaces 258) to highlight the offsets and the changes made through these initial steps of this example process.

If desired, features of the modified three-dimensional last structure (e.g., as shown in FIGS. 2N and 2O) may be further modified. Such additional modifications may be provided or made available, for example, to even more clearly make the three-dimensional design last structure correspond in size, shape, or appearance to a footwear upper. For example, additional features of the ankle shape, heel area, tongue area, instep area, toe area, or other areas of the design last may be modified. FIG. 2P illustrates a user interface section 260 that provides additional controls or input areas for controlling additional features of a three-dimensional design last structure according to at least some examples of this invention (e.g., to make the three-dimensional design last even more closely represent the size, shape, and structure of a final desired upper product). FIG. 2P illustrates an example view of the three-dimensional design last 262 in the form, for example, after the offsets and bottom structure are included, e.g., in the manners described above in conjunction with FIGS. 2A through 2O. As shown, in this arrangement, even with the previously applied offsets, various features of the three-dimensional design last structure may not correspond to a final, desired upper structure. For example, even with the desired offsets, the ankle area may be too thinned (or thin too abruptly in the direction from the sole toward the ankle opening—see input region 264), the ankle opening itself may be too narrow or otherwise undesirably shaped (see input region 266), or the instep/tongue area still may be too steep (see input region 268). This user interface section 260 provides tools to enable further modifications to these areas (other or additional modifying tools also may be provided, if desired, without departing from the invention).

FIG. 2Q illustrates an example of use of the ankle area adjustment input region 264. As shown, by changing the input value for the ankle shape (e.g., by typing a new value in at box 264a or by moving the sliding scale input 264b), the shape of the ankle area may be further controlled. This may be seen by comparing the narrower ankle view with the wider ankle view in input region 264 in FIG. 2Q. Other ways of inputting data to alter the ankle's vertical shape and/or user interfaces for doing so may be provided, if desired, without departing from this invention.

FIGS. 2Q and 2R illustrate an example of use of the ankle opening adjustment input region 266. As shown in the input region 266 of FIG. 2Q, the ankle opening may be adjusted to vary its shape from the relatively regular oval or elliptical structure 270 shown in the existing three-dimensional design last 262. If another ankle opening structure is selected (e.g., to appear more like a regular opening for a shoe upper), its specific size and/or shape may be adjusted using input region 266. FIG. 2Q illustrates the ankle opening region 270a having a wider rear portion. By adjusting a location of the sliding scale 266a, as shown in FIG. 2R, the anile opening region 270a may be adjusted, e.g., to move a wider portion of the opening 270a forward. Note the different appearances of the ankle opening regions 270a in input region 266 in FIG. 2Q as compared to FIG. 2R. If desired, other ways of inputting data to alter the ankle's opening shape and/or user interfaces for doing so may be provided without departing from this invention.

FIG. 2R further illustrates an input region 268 for varying the angle (or "flatness") of the tongue or instep area (e.g., by changing the value in user input box 268a or adjusting the sliding scale 268b). In FIG. 2R, a "0" incline value is included in input box 268a, which represents one tongue and/or instep steepness value and orientation. By altering the steepness value (e.g., changed to "3" in FIG. 2S), the user can selectively and further control the steepness of the tongue region (notably, by comparing the tongue incline 272 represented in input region 268 in FIGS. 2R and 2S, one can see that the tongue region incline 272 becomes somewhat flatter as the value in region 268a increased between FIGS. 2R and 2S). Other ways of inputting data to alter the angle of the tongue or instep region and/or user interfaces for doing so may be provided without departing from this invention.

Three-dimensional design lasts provided or produced in systems and methods in accordance with examples of this invention may include additional features that may be selectively altered or controlled by users, if desired. For example, if desired, an additional input region may be provided that allows the user to control the overall height of the three-dimensional design last to be produced (e.g., the height from the bottom of the heel area to the top of the ankle opening area, the location of the top surface of the three-dimensional design last structure, etc.). This feature may allow users to better visualize and design footwear of different heights (e.g., high tops, mid-height tops, low tops, etc.). As another example, if desired, an additional input region may be provided to allow users to control the vertical shape of the ankle opening area (e.g., to include a slant, to include abrupt direction changes, etc.).

Given the inputs provided at input regions 264, 266, and 268, the overall shape of the three-dimensional design last may be further modified, e.g., using the previously generated curves 214 and control points 220 (e.g., as shown in FIG. 2J) as the starting point. FIGS. 2T through 2V illustrate the progression of this processing in accordance with some examples of this invention. FIG. 2T shows the three-dimensional design last in its form after the offsets are applied as described above (and before the additional modifications from input regions 264, 266, and 268 are applied). By working around the various curves 214, the positions of the control points 220 and thus the curves 214 may be adjusted based on the additional input values supplied via regions 264, 266, and 268. FIG. 2U illustrates the partially completed adjustment (note the changing shape of the ankle opening region 270), and FIG. 2V illustrates the completed version (note the changed shape of the ankle region 270 to correspond to a value input through region 266). If desired, as illustrated in FIG. 2V, horizontal planar lines may be filled in (e.g., as described above in conjunction with FIG. 2K) to help better illustrate the surface features of this three-dimensional design last.

If desired, at this stage in the process, the surface of the three-dimensional design last may be further smoothed, e.g., by conventional computer graphics three-dimensional surface smoothing techniques, in order to provide a nicely smoothed surface from which the remainder of the design for the upper may be built. FIG. 2W illustrates "smoothing" of the lateral surfaces along and between curves 214 (through user activation of input element 274), and FIG. 2X illustrates "smoothing" of the longitudinal surfaces along and between the control points 220 (through user activation of input element 276). "Smoothing" of this type may include features like averaging or regularly offsetting of the location(s) of one or more curves or control points thereon based on the locations (optionally user fixed locations) of two or more surrounding or nearby curve or control point locations. If desired, the user interface input elements 274 and 276 may be omitted and these or other smoothing processes may be conducted automatically, if necessary, or omitted entirely.

FIGS. 2Y and 2Z illustrate side and rear views, respectively, of the final three-dimensional design last in accordance with one example of this invention. In these figures, the differences between the original three-dimensional last structure surface 278 (e.g., from a commercially available CAD package) and the final three-dimensional design last surface 280 are highlighted. Notably, the final three-dimensional design last surface 280 provides a smooth surface in the shape of an actual upper, which can serve as a launching point for additional design tasks.

Figure 3:
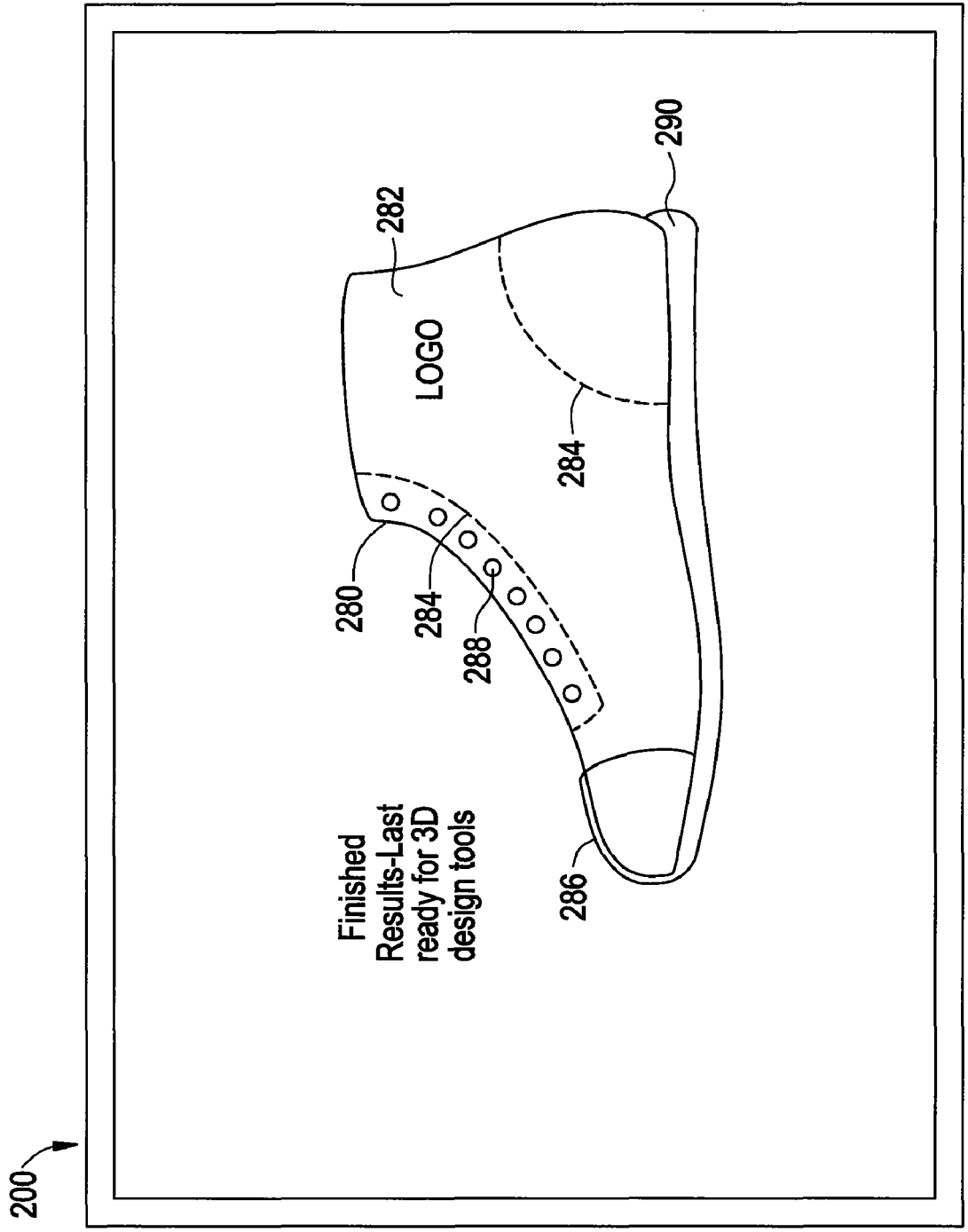
FIG. 3 illustrates various examples of the use of three-dimensional design last systems and methods in accordance with examples of this invention.

FIG. 3 illustrates a view of the three-dimensional design last surface 280 as it may be used at the start of other design processes. For example, as illustrated in FIG. 3, a designer may use this three-dimensional design last surface 280 as a starting point to add logos 282 or stitching 284 to form part of an overall design (e.g., to hold separate pieces of upper material together, etc.). As another example, if desired, the three-dimensional design last surface 280 may be used as a starting point to add other elements to the overall footwear design, such as a toe cap 286, a sole structure 290 (e.g., a midsole structure and/or an outsole structure), a shank, a heel counter, an arch support, etc. Any desired footwear design or structural elements may be included in a computer-aided design built using three-dimensional design last structures in accordance with examples of this invention, including securing element features, such as eyelets 288 for laces, etc.

The three-dimensional design lasts and upper/footwear designs prepared using such design lasts also may be used as a basis for producing three-dimensional models of footwear designs, e.g., using rapid prototyping and/or selective laser sintering processes. Rapid prototyping and/or laser sintering systems and methods are known and are commercially available that can take three-dimensional design data (e.g., CAD type data) and produce a solid model of the computer design. The three-dimensional design lasts according to examples of this invention may provide input data for such rapid prototyping and laser sintering systems.

III. CONCLUSION

While the invention has been described with respect to specific examples including presently preferred modes of carrying out the invention, those skilled in the art will appreciate that there are numerous variations and permutations of the above described systems and methods. For example various aspects of the invention may be used in different combinations and various different subcombinations of aspects of the invention may be used together in a single system or method without departing from the invention.

Also, various elements, components, and/or steps described above may be changed, changed in order, omitted, and/or additional elements, components, and/or steps may be added without departing from this invention. Additionally, while specific user interface elements and formats are shown in the illustrated examples, those skilled in the art will understand that any desired manner of presenting information to users and/or receiving their input may be used without departing from this invention. Thus, the invention should be construed broadly as set forth in the appended claims.

We claim:

1. A method for generating a modified three-dimensional design last structure for footwear on a computer display, comprising:
    generating an initial three-dimensional last structure on the computer display;
    receiving user input data through a computer input system, the user input data indicating plural offset values for plural zones of the initial three-dimensional last structure, wherein the user input data indicates plural desired offset values in at least one region of an article of footwear selected from the group of: a toe region of the article of footwear, a heel region of the article of footwear, an ankle region of the article of footwear, a forefoot region of the article of footwear, and an instep region of the article of footwear, wherein the user input data indicating the offset values need not indicate a constant offset value over the plural zones; and
    using a computer processing system, generating a modified three-dimensional design last structure for the footwear on the computer display based on the initial three-dimensional last structure and the user input data indicating the plural desired offset values, wherein the modified three-dimensional design last structure as rendered on the computer display has an increased thickness as compared to the initial three-dimensional last structure wherein the increased thickness is based on the user input data indicating the plural desired offset values, and wherein the modified three-dimensional design last structure is rendered on the computer display so as to simulate an appearance of an actual footwear upper.

2. A method according to claim 1, further comprising:
    receiving user input data through the computer input system indicating a desired shape of the ankle region for the modified three-dimensional design last structure when the modified three-dimensional design last structure is rendered on the computer display.

3. A method according to claim 2, wherein the user input data indicating the desired shape of the ankle area indicates at least one of a desired foot-receiving opening shape or a desired substantially vertical section shape of the ankle region.

4. A method according to claim 1, further comprising:
    receiving user input data through the computer input system indicating a desired shape of the instep region for the modified three-dimensional design last structure when the modified three-dimensional design last structure is rendered on the computer display.

5. A method according to claim 1, wherein the initial three-dimensional last structure generated on the computer display includes plural curves representing a surface location of the last structure, wherein at least some of the plural curves extend from the ankle region of the initial three-dimensional last structure to a sole region of the initial three-dimensional last structure and indicate a contour of the surface of the initial three-dimensional last structure, wherein at least some of the plural curves representing the surface location include plural control points, and wherein the user input data indicating the plural offset values for the plural zones of the initial three-dimensional last structure are used to modify locations of at least some of the control points and to thereby modify a shape of the surface defined by the plural curves.

6. A method according to claim 5, wherein the initial three-dimensional last structure includes from 20-50 curves representing the surface location.

7. A method according to claim 5, wherein at least some of the plural curves representing the surface location of the initial three-dimensional last structure include from 5-20 control points.

8. A method according to claim 5, wherein the generating of the modified three-dimensional design last structure includes generating a display element representing a surface location of the modified three-dimensional design last structure, wherein the surface location is determined based on the modified locations of the control points from the initial three-dimensional last structure.

9. A method according to claim 1, further comprising:
    receiving user input data through the computer input system indicating a desired design feature for an article of footwear designed using the modified three-dimensional design last structure.

10. A method according to claim 1, further comprising:
    receiving user input data through the computer input system indicating features of a sole structure to be engaged with the three-dimensional design last.

11. A method according to claim 10, wherein the features of the sole structure include at least one of features of a midsole structure or features of an outsole structure.

12. A system for generating a modified three-dimensional design last structure on a display device, comprising:
a display device;
an input system for receiving user input data indicating plural offset values for plural zones of an initial three-dimensional last structure, wherein the user input data indicates plural desired offset values in at least one region of an article of footwear selected from the group of: a toe region of the article of footwear, a heel region of the article of footwear, an ankle region of the article of footwear, a forefoot region of the article of footwear, and an instep region of the article of footwear, wherein the user input indicating the offset values need not indicate a constant offset value over the plural zones; and
a processing system programmed and adapted to: (a) generate an initial three-dimensional last structure on the display device and (b) generate a modified three-dimensional design last structure for the footwear on the display device based on the initial three-dimensional last structure and the user input data indicating the plural desired offset values, wherein the modified three-dimensional design last structure as rendered on the display device has an increased thickness as compared to the initial three-dimensional last structure, wherein the increased thickness is based on the user input data indicating the plural desired offset values, and wherein the modified three-dimensional design last structure is rendered on the display device so as to simulate an appearance of an actual footwear upper.

13. A system according to claim 12, wherein the input system further receives user input data indicating a desired shape of the ankle region for the modified three-dimensional design last structure, wherein the user input data indicating the desired shape of the ankle area indicates at least one of a desired foot-receiving opening shape or a desired substantially vertical section shape of the ankle region.

14. A system according to claim 12, wherein the input system further receives user input data indicating a desired shape of the instep region for the modified three-dimensional design last structure.

15. A system according to claim 12, wherein the processing system generates the initial three-dimensional last structure to include plural curves representing a surface location of the initial three-dimensional last structure, wherein at least some of the plural curves extend from the ankle region of the initial three-dimensional last structure to a sole region of the initial three-dimensional last structure and indicate a contour of the surface of the initial three-dimensional last structure, wherein at least some of the plural curves representing the surface location include plural control points, and wherein the user input data indicating the plural offset values for the plural zones of the initial three-dimensional last structure are used by the processing system when generating the modified three-dimensional design last structure to modify locations of at least some of the control points and to thereby modify a shape of the surface defined by the plural curves.

16. A system according to claim 15, wherein the initial three-dimensional last structure includes from 20-50 curves representing the surface location.

17. A system according to claim 15, wherein at least some of the plural curves representing the surface location of the initial three-dimensional last structure include from 5-20 control points.

18. A system according to claim 12, wherein the input system further receives user input data indicating features of a sole structure to be engaged with the modified three-dimensional design last structure when rendered on the display device, wherein the features of the sole structure include at least one of features of a midsole structure or features of an outsole structure.

19. A non-transitory computer-readable medium including computer executable instructions stored thereon for performing a method for generating a modified three-dimensional design last structure for footwear on a computer display, the method comprising:
generating an initial three-dimensional last structure on the computer display;
receiving user input data indicating plural offset values for plural zones of the initial three-dimensional last structure, wherein the user input data indicates plural desired offset values in at least one region of an article of footwear selected from the group of: a toe region of the article of footwear, a heel region of the article of footwear, an ankle region of the article of footwear, a forefoot region of the article of footwear, and an instep region of the article of footwear, wherein the user input indicating the offset values need not indicate a constant offset value over the plural zones; and
generating a modified three-dimensional design last structure for the footwear on the computer display based on the initial three-dimensional last structure and the user input data indicating the plural desired offset values, wherein the modified three-dimensional design last structure as rendered on the computer display has an increased thickness as compared to the initial three-dimensional last structure, wherein the increased thickness is based on the user input data indicating the plural desired offset values, and wherein the modified three-dimensional design last structure is rendered on the computer display so as to simulate an appearance of an actual footwear upper.

20. A non-transitory computer-readable medium according to claim 19, wherein the method further comprises:
receiving user input data indicating a desired shape of the ankle region for the modified three-dimensional design last structure, wherein the user input data indicating the desired shape of the ankle area indicates at least one of a desired foot-receiving opening shape or a desired substantially vertical section shape of the ankle region.

21. A non-transitory computer-readable medium according to claim 19, wherein the method further comprises:
receiving user input data indicating a desired shape of the instep region for the modified three-dimensional design last structure.

22. A non-transitory computer-readable medium according to claim 19, wherein the initial three-dimensional last structure includes plural curves representing a surface location of the initial three-dimensional last structure, wherein at least some of the plural curves extend from the ankle region of the initial three-dimensional last structure to a sole region of the initial three-dimensional last structure and indicate a contour of the surface of the initial three-dimensional last structure, wherein at least some of the plural curves representing the surface location include plural control points, and wherein the user input data indicating the plural offset values for the plural zones of the initial three-dimensional last structure are used to modify locations of at least some of the control points and to thereby modify a shape of the surface defined by the plural curves.

23. A non-transitory computer-readable medium according to claim 22, wherein the initial three-dimensional last structure includes from 20-50 curves representing the surface location.

24. A non-transitory computer-readable medium according to claim 22, wherein at least some of the plural curves representing the surface location of the initial three-dimensional last structure include from 5-20 control points.

25. A non-transitory computer-readable medium according to claim 19, wherein the method further comprises:
receiving user input data indicating features of a sole structure to be engaged with the modified three-dimensional design last, wherein the features of the sole structure include at least one of features of a midsole structure or features of an outsole structure.

* * * * *